(12) United States Patent
Van Der Auwera et al.

(10) Patent No.: US 10,957,044 B2
(45) Date of Patent: Mar. 23, 2021

(54) SPHERE POLE PROJECTIONS FOR EFFICIENT COMPRESSION OF 360-DEGREE VIDEO

(71) Applicant: QUALCOMM Incorporated, San Diego, CA (US)

(72) Inventors: Geert Van Der Auwera, Del Mar, CA (US); Muhammed Coban, Carlsbad, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 220 days.

(21) Appl. No.: 15/926,957

(22) Filed: Mar. 20, 2018

(65) Prior Publication Data

US 2018/0276826 A1    Sep. 27, 2018

Related U.S. Application Data

(60) Provisional application No. 62/474,767, filed on Mar. 22, 2017, provisional application No. 62/528,264, filed on Jul. 3, 2017.

(51) Int. Cl.
*G06T 7/11* (2017.01)
*G06T 3/00* (2006.01)
(Continued)

(52) U.S. Cl.
CPC ............ *G06T 7/11* (2017.01); *G02B 27/0172* (2013.01); *G06T 3/005* (2013.01); *G06T 3/0062* (2013.01);
(Continued)

(58) Field of Classification Search
CPC ......... G06T 7/11; G06T 3/005; G06T 3/0062; G06T 3/0093; G06T 19/006;
(Continued)

(56) References Cited

U.S. PATENT DOCUMENTS

2019/0356898 A1* 11/2019 Choi .................... H04N 13/139

OTHER PUBLICATIONS

Choi B., et al., "OMAF Pack-VE: Multi-Patch based Packing for Omnidirectional Video", 117. MPEG Meeting; Jan. 16, 2017-Jan. 20, 2017; Geneva; (Motion Picture Expert Group or ISO/IEC JTC1/SC29/WG11), No. m39841, Jan. 11, 2017 (Jan. 11, 2017), 6 Pages, XP030068186.
(Continued)

*Primary Examiner* — Mark Roz
(74) *Attorney, Agent, or Firm* — Campbell C. Chiang; Polsinelli LLP

(57) ABSTRACT

Provided are systems and methods for processing 360-degree video data. In various implementations, a spherical representation of a 360-degree video frame can be segmented into a top region, a bottom region, and a middle region. The middle region can be mapped into one or more rectangular areas of an output video frame. The top region can be mapped into a first rectangular area of the output video frame using a mapping that converts a square to a circle, such that pixels in the circular top region are expanded to fill the first rectangular region. The bottom region can be mapped into a second rectangular area of the output video frame such that pixels in the circular bottom region are expanded to fill the second rectangular region.

29 Claims, 14 Drawing Sheets
(2 of 14 Drawing Sheet(s) Filed in Color)

(51) Int. Cl.

| | |
|---|---|
| *G02B 27/01* | (2006.01) |
| *H04N 13/117* | (2018.01) |
| *G06T 19/00* | (2011.01) |
| *H04N 19/176* | (2014.01) |
| *H04N 19/196* | (2014.01) |
| *H04N 19/182* | (2014.01) |
| *H04N 19/117* | (2014.01) |
| *H04N 13/161* | (2018.01) |
| *H04N 13/194* | (2018.01) |
| *H04N 19/85* | (2014.01) |
| *H04N 19/597* | (2014.01) |
| *H04N 19/88* | (2014.01) |
| *H04N 5/232* | (2006.01) |

(52) U.S. Cl.
CPC .......... *G06T 3/0093* (2013.01); *G06T 19/006* (2013.01); *H04N 13/117* (2018.05); *H04N 13/161* (2018.05); *H04N 13/194* (2018.05); *H04N 19/117* (2014.11); *H04N 19/176* (2014.11); *H04N 19/182* (2014.11); *H04N 19/197* (2014.11); *H04N 19/597* (2014.11); *H04N 19/85* (2014.11); *H04N 19/88* (2014.11); *G02B 2027/014* (2013.01); *G02B 2027/0138* (2013.01); *H04N 5/23238* (2013.01)

(58) Field of Classification Search
CPC .. H04N 19/117; H04N 19/176; H04N 19/182; H04N 19/197; H04N 19/597; H04N 19/85; H04N 19/88; H04N 13/117; H04N 13/194; H04N 13/161; H04N 5/23238; G02B 27/0172; G02B 2027/0138; G02B 2027/014
USPC .......................................................... 382/276
See application file for complete search history.

(56) References Cited

OTHER PUBLICATIONS

Lambers M., "Mappings between Sphere, Disc, and Square," Journal of Computer Graphics Techniques, vol. 5, No. 2, Mar. 16, 2017, 21 pp., accessed on Jun. 9, 2016, URL: http://jcgt.org/published/0005/02/01/.
Lee Y-H., et al., "AHG8: EAP-Based Segmented Sphere Projection with Padding", 6. JVET Meeting; Mar. 31, 2017-Apr. 7, 2017; Hobart; (The Joint Video Exploration Team of ISO/IEC JTC1/SC29/WG11 and ITU-T SG.16); URL: http://phenix.int-evry.fr/jvet/, No. JVET-F0052, Mar. 24, 2017 (Mar. 24, 2017), pp. 1-9, XP030150712.
Li J., et al., "Novel Tile Segmentation Scheme for Omnidirectional Video", 2016 IEEE International Conference on Image Processing (ICIP), IEEE, Sep. 25, 2016 (Sep. 25, 2016), pp. 370-374, XP033016554, DOI: 10.1109/ICIP.2016.7532381 [retrieved on Aug. 3, 2016].
Lin H-C., et al., "AHG8: Compact Cube Layout with Tile Partition", 4. JVET Meeting; Oct. 15, 2016-Oct. 21, 2016; Chengdu; (The Joint Video Exploration Team of ISO/IEC JTC1/SC29/WG11 and ITU-T SG.16); URL: http://phenix.int-evry.fr/jvet/, No. JVET-D0104, Oct. 6, 2016 (Oct. 6, 2016), pp. 1-6, XP030150347.
Oh S., "Projections Under Consideration for ISO/IEC 23090-2 Omnidirectional MediA Format", 118. MPEG Meeting; Apr. 3, 2017-Apr. 7, 2017; Hobart; (Motion Picture Expert Group or ISO/IEC JTC1/SC29/WG11), No. N16828, Apr. 28, 2017 (Apr. 28, 2017), 28 Pages, XP030023494.
Ohashi A., et al., "Fisheye Stereo Camera Using Equirectangular Images", 2016 11th France-Japan & 9th Europe-Asia Congress on Mechatronics (Mecatronics) / 17th International Conference on Research and Education in Mechatronics (REM), IEEE, Jun. 15, 2016 (Jun. 15, 2016), pp. 284-289, XP032946595, DOI: 10.1109/Mecatronics.2016.7547156 [retrieved on Aug. 17, 2016].
Partial International Search Report—PCT/US2018/023604—ISA/EPO—dated Jun. 18, 2018.
Van Der Auwera G., et al., "AHG8: ECP with Padding for 360-Degree Video", 7. JVET Meeting; Jul. 13, 2017-Jul. 21, 2017; Torino; (The Joint Video Exploration Team of ISO/IEC JTC1/SC29/WG11 and ITU-T SG.16); URL: http://phenix.int-evry.fr/jvet/, No. JVET-G0074-v2, Jul. 15, 2017 (Jul. 15, 2017), pp. 1-14, XP030150866, the whole document.
Van Der Auwera G., et al., "AHG8: Equatorial Cylindrical Projection for 360-Degree Video", 6. JVET Meeting; Mar. 31, 2017-Apr. 7, 2017; Hobart; (The Joint Video Exploration Team of ISO/IEC JTC1/SC29/WG11 and ITU-T SG.16); URL: http://phenix.int-evry.fr/jvet/ No. JVET-F0026, Mar. 24, 2017 (Mar. 24, 2017), pp. 1-4, XP030150676, the whole document.
Ye Y., et al., "Algorithm Descriptions of Projection Format Conversion and Video Quality Metrics in 360Lib," JVET-E1003, 5th Meeting, Jan. 12-20, 2017, Joint Video Exploration Team (JVET) of ITU-T SG16 WP 3 and ISO/IEC JTC / SC29/WG11, Feb. 11, 2017, XP030150650, 22 Pages.
Zhang C., et al., "AHG8: Segmented Sphere Projection (SSP) for 360-Degree Video Content", 4. JVET Meeting; Oct. 15, 2016-Oct. 21, 2016; Chengdu; (The Joint Video Exploration Team of ISO/IEC JTC1/SC29/WG11 and ITU-T SG.16); URL: http://phenix.intevry.fr/jvet/, No. JVET-D0030, Oct. 6, 2016 (Oct. 6, 2016), pp. 1-4, XP030150256.
Zhang C., et al., "AHG8: Segmented Sphere Projection for 360-degree Video," JVET-E0025, Jan. 12-20, 2017, Joint Video Exploration Team (JVET) of ITU-T SG 16 WP 3 and ISO/IEC JTC1/SC29/WG11, Dec. 30, 2016, XP030150486, 5 Pages.
International Search Report and Written Opinion—PCT/US2018/023604—ISA/EPO—dated Sep. 4, 2018.
Jin Y., et al., "An Efficient Spherical Video Sampling Scheme Based on Cube Model", 2017 IEEE International Conference on Consumer Electronics (ICCE), Jan. 8, 2017, pp. 211-214, XP033082767, DOI: 10.1109/ICCE.2017.7889288 [retrieved on Mar. 29, 2017].
Zhang C., et al., "OMAF PACK-VE: Guard band for SSP and ERP", 117th MPEG Meeting; Jan. 16, 2017-Jan. 20, 2017; Geneva; (Motion Picture Expert Group or ISO/IEC JTC1/SC29/WG11),, No. m40067, Jan. 14, 2017, XP030068412, 5 pages.

* cited by examiner

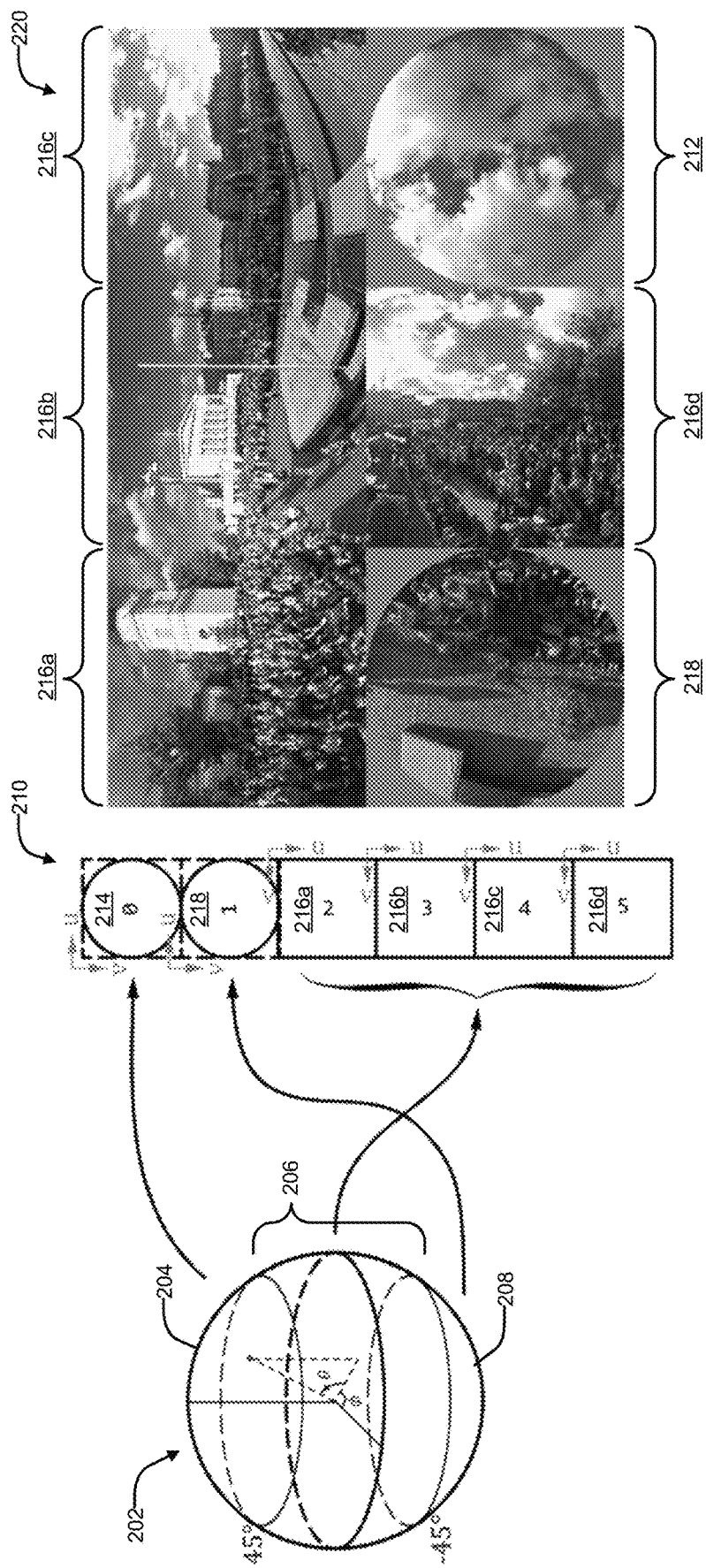

1000

Obtaining 360-degree video data including a plurality of video frames, each video frame of the plurality of video frames including a spherical representation of video data for the video frame
1002

Segmenting a video frame from the plurality video frames into a top region, a middle region, and a bottom region, the top region including a first circular area of the spherical representation, the bottom region including a second circular area of the spherical representation that is opposite on the spherical representation from the first circular area, wherein the middle region includes an area of the spherical representation not included in the top region or the bottom region
1004

Mapping the top region into a first rectangular area of the output video frame, wherein mapping the top region includes expanding video data included in the first circular area to fill the first rectangular area
1006

Mapping the bottom region into a second rectangular area of the output video frame, wherein mapping the bottom region includes expanding video data included the second circular area to fill the second rectangular area
1008

```
┌─────────────────────────────────────────────┐
│ Obtaining 360-degree video data including a │
│ plurality of video frames, each video frame │
│ from the plurality of video frames          │
│ including a two-dimensional representation  │
│ of video data for the video frame           │
│ 1102                                        │
└─────────────────────────────────────────────┘
                      │
                      ▼
┌─────────────────────────────────────────────┐
│ Identifying a first rectangular area of a   │
│ video frame from the plurality of video     │
│ frames                                      │
│ 1104                                        │
└─────────────────────────────────────────────┘
                      │
                      ▼
┌─────────────────────────────────────────────┐
│ Mapping the first rectangular area into a   │
│ top region of a spherical representation of │
│ video data for the video frame, wherein the │
│ top region comprises a first circular area  │
│ of the spherical representation, and        │
│ wherein mapping the first rectangular area  │
│ includes arranging video data from the      │
│ first rectangular area into the first       │
│ circular area;                              │
│ 1106                                        │
└─────────────────────────────────────────────┘
                      │
                      ▼
┌─────────────────────────────────────────────┐
│ Identifying a second rectangular area of    │
│ the video frame                             │
│ 1108                                        │
└─────────────────────────────────────────────┘
                      │
                      ▼
┌─────────────────────────────────────────────┐
│ Mapping the second rectangular area into a  │
│ bottom region of the spherical              │
│ representation, wherein the bottom region   │
│ comprises a second circular area of the     │
│ spherical representation, and wherein       │
│ mapping the second rectangular area         │
│ includes arranging video data from the      │
│ second rectangular area into the second     │
│ circular area                               │
│ 1110                                        │
└─────────────────────────────────────────────┘
```

FIG. 11

SPHERE POLE PROJECTIONS FOR EFFICIENT COMPRESSION OF 360-DEGREE VIDEO

CROSS-REFERENCES TO RELATED APPLICATIONS

This application claims the benefit of and priority to U.S. Provisional Application No. 62/474,767, filed on Mar. 22, 2017, and U.S. Provisional Application No. 62/528,264, filed on Jul. 3, 2017. The preceding applications are hereby incorporated by reference herein, in their entireties.

BACKGROUND

Virtual reality (VR) describes a three-dimensional, computer-generated environment that can be interacted within a seemingly real or physical way. Generally, a user experiencing a virtual reality environment can turn left or right, look up or down, and/or move forwards and backwards, thus changing her point of view of the virtual environment. The 360-degree video presented to the user can change accordingly, so that the user's experience is as seamless as in the real world. Virtual reality video can be captured and rendered at very high quality, potentially providing a truly immersive virtual reality experience.

To provide a seamless 360-degree view, the video captured by a 360-degree video capture system typically undergoes image stitching. Image stitching in the case of 360-degree video generation involves combining or merging video frames from adjacent cameras in the area where the video frames overlap or would otherwise connect. The result would be an approximately spherical frame. Similar to a Mercator projection, however, the merged data is typically represented in a planar fashion. For example, the pixels in a merged video frame may be mapped onto the planes of a cube shape, or some other three-dimensional, planar shape (e.g., a pyramid, an octahedron, a decahedron, etc.). Video capture and video display devices generally operate on a raster principle—meaning that a video frame is treated as a grid of pixels—thus square or rectangular planes are typically used to represent a spherical environment.

360-degree video can be encoded for storage and/or transmission. Video coding standards include International Telecommunication Union (ITU) ITU-T H.261, International Standards Organization/International Electronics Commission (ISO/IEC) Motion Picture group (MPEG) MPEG-1 Visual, ITU-T H.262 or ISO/IEC MPEG-2 Visual, ITU-T H.263, ISO/IEC MPEG-4 Visual, ITU-T H.264 (also known as ISO/IEC MPEG-4 AVC), including its Scalable Video Coding (SVC) and Multiview Video Coding (MVC) extensions and ITU-T H.265 (also known as ISO/IEC MPEG-4 HEVC) with its extensions.

BRIEF SUMMARY

In various implementations, techniques and systems are described for processing 360-degree video data to obtain better coding efficiency. These techniques and systems can include using a segmented sphere projection to divide a spherical representation of a 360-degree video frame into a north pole or top region, a south pole or bottom region, and a equatorial or middle region. The regions can then be mapped to a two-dimensional, rectangular format that can be easier for coding devices to manipulate. In generating this mapping, the circular north pole and south pole regions of the segmented sphere projection can be expanded, using various techniques, to fill a rectangular region of the output video frame. By mapping the polar regions into all corners of a rectangular region, all available pixels in the output video frame can include usable data. A video frame generated in this manner may encode more efficiently than video frames for 360-degree video that have been generated using other methods.

In various implementations, additional visual improvement can be achieved by applying a gradual sampling adjustment in certain areas of the output video frame. For example, any discontinuity between a rectangular region into which a polar region was mapped and a rectangular region into which a part of the equatorial region was mapped can be reduced by applying a gradual change to the location in the video frame into which the samples are mapped. In this and other examples, the gradual change is applied to the rectangular region for a polar region of the spherical video data.

According to at least one example, a method for encoding video data is provided. In various implementations, the method includes obtaining 360-degree video data including a plurality of video frames, each video frame of the plurality of video frames including a spherical representation of video data for the video frame. The method further includes segmenting a video frame from the plurality video frames into a top region, a middle region, and a bottom region, the top region including a first circular area of the spherical representation, the bottom region including a second circular area of the spherical representation that is opposite on the spherical representation from the first circular area, wherein the middle region includes an area of the spherical representation not included in the top region or the bottom region. The method further includes mapping the top region into a first rectangular area of the output video frame, wherein mapping the top region includes expanding video data included in the first circular area to fill the first rectangular area. The method further includes mapping the bottom region into a second rectangular area of the output video frame, wherein mapping the bottom region includes expanding video data included the second circular area to fill the second rectangular area.

In another example, an apparatus is provided that includes a memory configured to store 360-degree video data and a processor. The 360-degree video data can include a plurality of video frames, each video frame of the plurality of video frames including a spherical representation of video data for the video frame The processor is configured to and can segment a video frame from the plurality video frames into a top region, a middle region, and a bottom region, the top region including a first circular area of the spherical representation, the bottom region including a second circular area of the spherical representation that is opposite on the spherical representation from the first circular area, wherein the middle region includes an area of the spherical representation not included in the top region or the bottom region. The processor is configured to and can map the top region into a first rectangular area of the output video frame, wherein mapping the top region includes expanding video data included in the first circular area to fill the first rectangular area. The processor is configured to and can map the bottom region into a second rectangular area of the output video frame, wherein mapping the bottom region includes expanding video data included the second circular area to fill the second rectangular area.

In another example, a non-transitory computer-readable medium is provided having stored thereon instructions that, when executed by one or more processors, cause the one or more processors to perform operations including obtaining 360-degree video data including a plurality of video frames, each video frame of the plurality of video frames including a spherical representation of video data for the video frame. The instructions can further cause the one or more processors to perform operations including segmenting a video frame from the plurality video frames into a top region, a middle region, and a bottom region, the top region including a first circular area of the spherical representation, the bottom region including a second circular area of the spherical representation that is opposite on the spherical representation from the first circular area, wherein the middle region includes an area of the spherical representation not included in the top region or the bottom region. The instructions can further cause the one or more processors to perform operations including mapping the top region into a first rectangular area of the output video frame, wherein mapping the top region includes expanding video data included in the first circular area to fill the first rectangular area. The instructions can further cause the one or more processors to perform operations including mapping the bottom region into a second rectangular area of the output video frame, wherein mapping the bottom region includes expanding video data included the second circular area to fill the second rectangular area.

In another example, an apparatus is provided that includes means for obtaining 360-degree video data including a plurality of video frames, each video frame of the plurality of video frames including a spherical representation of video data for the video frame. The apparatus further comprises means for segmenting a video frame from the plurality video frames into a top region, a middle region, and a bottom region, the top region including a first circular area of the spherical representation, the bottom region including a second circular area of the spherical representation that is opposite on the spherical representation from the first circular area, wherein the middle region includes an area of the spherical representation not included in the top region or the bottom region. The apparatus further comprises means for means for mapping the top region into a first rectangular area of the output video frame, wherein mapping the top region includes expanding video data included in the first circular area to fill the first rectangular area. The apparatus further comprises means for mapping the bottom region into a second rectangular area of the output video frame, wherein mapping the bottom region includes expanding video data included the second circular area to fill the second rectangular area.

In some aspects, the video frame is segmented at a first latitude above an equator of the spherical representation and a second latitude below the equator, wherein the first latitude and the second latitude are equidistant from the equator, wherein the top region is above the first latitude, and wherein the bottom region is below the second latitude.

In some aspects, mapping the top region and mapping the bottom region includes selecting a pixel location in the output video frame, and determining a point on the spherical representation corresponding to the pixel location, wherein the point on the spherical representation is determined using a mapping for converting from a square to a circle. These aspects further include sampling a pixel from the point on the spherical representation, and placing the sampled pixel at the pixel location. In some aspects, the mapping for converting a square to a circle minimizes distortion in the output video frame. In some aspects, mapping the top region and mapping the bottom region further includes adjusting the pixel location using a gradual curve function. In some aspects, the gradual curve function is used at pixel locations in an area adjacent to a third rectangular area in the video frame. In some aspects, the gradual curve function changes pixel locations less towards a middle area of the first rectangular area or the second rectangular area, and more towards an outside area of the first rectangular area or the second rectangular area.

In some aspects, the methods, apparatus, and computer-readable medium further include mapping the middle region to one or more rectangular areas of an output video frame. In some aspects, the middle region includes a left view, a front view, and a right view, wherein the left view is placed in the output video frame adjacent to the front view, and wherein the right view is placed adjacent to front view.

In some aspects, the middle region includes a back view, wherein the bottom region is placed in the output video frame adjacent to the back view, and wherein the top region is placed adjacent to the back view.

In some aspects, mapping the top region into the first rectangular area includes applying a gradual adjustment in an area where the first rectangular area is adjacent to a third rectangular area in the output video frame, and wherein mapping the bottom region into the second rectangular area includes applying the gradual adjustment in an area where the second rectangular area that is adjacent to a fourth rectangular area in the output video frame.

In some aspects, the output video frame has a three-by-two aspect ratio.

According to at least one example, a method for encoding video data is provided. In various implementations, the method includes obtaining 360-degree video data including a plurality of video frames, each video frame from the plurality of video frames including a two-dimensional representation of video data for the video frame. The method further includes identifying a first rectangular area of a video frame from the plurality of video frames. The method further includes mapping the first rectangular area into a top region of a spherical representation of video data for the video frame, wherein the top region comprises a first circular area of the spherical representation, and wherein mapping the first rectangular area includes arranging video data from the first rectangular area into the first circular area. The method further includes identifying a second rectangular area of the video frame. The method further includes mapping the second rectangular area into a bottom region of the spherical representation, wherein the bottom region comprises a second circular area of the spherical representation, and wherein mapping the second rectangular area includes arranging video data from the second rectangular area into the second circular area.

In another example, an apparatus is provided that includes a memory configured to store 360-degree video data and a processor. The 360-degree video data can include a plurality of video frames, each video frame from the plurality of video frames including a two-dimensional representation of video data for the video frame The processor is configured to and can identify a first rectangular area of a video frame from the plurality of video frames. The processor is configured to and can map the first rectangular area into a top region of a spherical representation of video data for the video frame, wherein the top region comprises a first circular area of the spherical representation, and wherein mapping the first rectangular area includes arranging video data from the first rectangular area into the first circular area. The processor is configured to and can identify a second rectangular area of the video frame. The processor is configured to and can map the second rectangular area into a bottom region of the spherical representation, wherein the bottom region comprises a second circular area of the spherical representation, and wherein mapping the second rectangular area includes arranging video data from the second rectangular area into the second circular area.

In another example, a non-transitory computer-readable medium is provided having stored thereon instructions that, when executed by one or more processors, cause the one or more processors to perform operations including obtaining 360-degree video data including a plurality of video frames, each video frame from the plurality of video frames including a two-dimensional representation of video data for the video frame. The instructions can further cause the one or more processors to perform operations including identifying a first rectangular area of a video frame from the plurality of video frames. The instructions can further cause the one or more processors to perform operations including mapping the first rectangular area into a top region of a spherical representation of video data for the video frame, wherein the top region comprises a first circular area of the spherical representation, and wherein mapping the first rectangular area includes arranging video data from the first rectangular area into the first circular area. The instructions can further cause the one or more processors to perform operations including identifying a second rectangular area of the video frame. The instructions can further cause the one or more processors to perform operations including mapping the second rectangular area into a bottom region of the spherical representation, wherein the bottom region comprises a second circular area of the spherical representation, and wherein mapping the second rectangular area includes arranging video data from the second rectangular area into the second circular area.

In another example, an apparatus is provided that includes means for obtaining 360-degree video data including a plurality of video frames, each video frame from the plurality of video frames including a two-dimensional representation of video data for the video frame. The apparatus further comprises means for identifying a first rectangular area of a video frame from the plurality of video frames. The apparatus further comprises means for mapping the first rectangular area into a top region of a spherical representation of video data for the video frame, wherein the top region comprises a first circular area of the spherical representation, and wherein mapping the first rectangular area includes arranging video data from the first rectangular area into the first circular area. The apparatus further comprises means for means for identifying a second rectangular area of the video frame. The apparatus further comprises means for means for mapping the second rectangular area into a bottom region of the spherical representation, wherein the bottom region comprises a second circular area of the spherical representation, and wherein mapping the second rectangular area includes arranging video data from the second rectangular area into the second circular area.

In some aspects, the top region includes a surface of the spherical representation above a first latitude of the spherical representation, wherein the bottom region includes a surface of the spherical representation below a second latitude of the spherical representation, wherein the first latitude and the second latitude are equidistant from an equator of the spherical representation.

In some aspects, mapping the one or more rectangular areas includes selecting a point on spherical representation, and determining a pixel location in the video frame that corresponds to the point, wherein the pixel location is determined using a mapping for converting a three-dimensional sphere to two-dimensional rectangle. These aspects further include sampling a pixel from the pixel location, and placing the sampled pixel at the point.

In some aspects, mapping the first rectangular area and mapping the second rectangular area includes selecting a point on the spherical representation, and determining a pixel location in the video frame that corresponds to the point, wherein the pixel location is determined using a mapping for converting a circle to a square. These aspects further include sampling a pixel from the pixel location, and placing the sampled pixel at the point. In some aspects, the mapping for converting a circle to a square reverses distortion caused when video data in the first rectangular area or the second rectangular area was expanded to fill the first rectangular area or the second rectangular area. In some aspects, mapping the first rectangular area and mapping the second rectangular area further includes adjusting the pixel location using a gradual curve function. In some aspects, the gradual curve function used at pixel locations in an area adjacent to at least one of the one or more additional rectangular areas. In some aspects, the gradual curve function changes pixel locations less towards a middle area of the first rectangular area or the second rectangular area, and more towards an outside area of the first rectangular area or the second rectangular area.

In some aspects, the methods, apparatus, and computer-readable medium further include mapping one or more additional rectangular areas of the video frame into a middle region of the spherical representation. In some aspects, the one or more additional rectangular areas include a left view, a front view and a right view, wherein the left view is located adjacent to the front view, and wherein the right view is adjacent to the front view.

In some aspects, the one or more additional rectangular areas include a back view, wherein the first rectangular area is adjacent to the back view, and wherein the second rectangular area is adjacent to the back view.

In some aspects, mapping the first rectangular area into the top region includes applying a gradual adjustment in an area where the first rectangular area is adjacent to a third rectangular area from the one or more additional rectangular areas, and wherein mapping the second rectangular area into the bottom region includes applying a gradual adjusting in an area where the second rectangular area is adjacent to a fourth rectangular area form the one or more additional rectangular areas.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

BRIEF DESCRIPTION OF THE DRAWINGS

The patent or application file contains at least one drawing executed in color. Copies of this patent or patent application publication with color drawing(s) will be provided by the Office upon request and the payment of the necessary fee.

Illustrative embodiments of the present invention are described in detail below with reference to the following drawing figures:

FIG. 2A is a diagram illustrating a segmented sphere projection of the surface of a sphere to a vertical mapping.

FIG. 2B is a diagram illustrating an example video frame generated using a 3×2 arrangement of the mappings that can be generated using the segmented sphere projection.

FIG. 10 is a flow diagram illustrating an example of a process for processing video data according to the techniques discussed herein.

FIG. 11 is a flow diagram illustrating an example of a process for processing video data according to the techniques discussed herein.

DETAILED DESCRIPTION

Figure 1A:
FIG. 1A illustrates a video frame that includes an equirectangular projection of a 360-degree video frame.

Certain aspects and embodiments of this disclosure are provided below. Some of these aspects and embodiments may be applied independently and some of them may be applied in combination as would be apparent to those of skill in the art. In the following description, for the purposes of explanation, specific details are set forth in order to provide a thorough understanding of embodiments of the invention. However, it will be apparent that various embodiments may be practiced without these specific details. The figures and description are not intended to be restrictive.

The ensuing description provides examples only, and is not intended to limit the scope, applicability, or configuration of the disclosure. Rather, the ensuing description of various examples will provide those skilled in the art with an enabling description for implementing any of the examples. It should be understood that various changes may be made in the function and arrangement of elements without departing from the spirit and scope of the invention as set forth in the appended claims.

Specific details are given in the following description to provide a thorough understanding of the examples. However, it will be understood by one of ordinary skill in the art that the examples may be practiced without these specific details. For example, circuits, systems, networks, processes, and other components may be shown as components in block diagram form in order not to obscure the examples in unnecessary detail. In other instances, well-known circuits, processes, algorithms, structures, and techniques may be shown without unnecessary detail in order to avoid obscuring the examples.

Also, it is noted that individual examples may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

Furthermore, various examples may be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a computer-readable or machine-readable medium. A processor(s) may perform the necessary tasks.

Virtual reality (VR) describes a three-dimensional, computer-generated environment that can be interacted with in a seemingly real or physical way. In some cases, a user experiencing a virtual reality environment uses electronic equipment, such as a head-mounted display (HMD) and optionally also other articles that can be worn, such as gloves fitted with sensors, to interact with the virtual environment. As the user moves in the real world, images rendered in the virtual environment also change, giving the user the perception that the user is moving within the virtual environment. In some cases, the virtual environment includes sound that correlates with the movements of the user, giving the user the impression that the sounds originate from a particular direction or source. Virtual reality video can be captured and rendered at very high quality, potentially providing a truly immersive virtual reality experience.

Virtual reality applications include gaming, training, education, sports video, and online shopping, among others.

360-degree video is video captured for display in a virtual reality environment. For example, a frame of 360-degree video can include a full 360 degrees visible from a given point, such that the frame includes pixels for all or part of a sphere centered on the point. 360-degree video data can also be referred to as spherical video, because 360-degree video captures a view in all directions, such that each 360-degree video frame can be visualized as a sphere of captured pixels. A frame of 360-degree video can be computer-generated, and can be used to present fictional environments. In some applications, video from the real world can be used in the presentation of a virtual reality environment. In these applications, a user can experience another location in the same way that the user can experience a present location. For example, a user can experience a walking tour of Berlin while using a 360-degree video system that is situated in San Francisco.

A 360-degree video system can include a video capture device and a video display device, and possibly also other intermediate devices such as servers, data storage, and data transmission equipment. A video capture device may include a camera set, that is, a set of multiple cameras, each oriented in a different direction and capturing a different view. In various applications, two to six cameras can be used to capture a full 360-degree view centered on the camera set's location. Some video capture devices may use fewer cameras, such as for example video capture devices that capture primarily side-to-side views. A video includes frames, where a frame is an electronically coded still image of a scene. Cameras capture a certain number of frames per second, which is referred to as the camera's frame rate.

In some cases, to provide a seamless 360-degree view, the video captured by each of the cameras in the camera set undergoes image stitching. Image stitching in the case of 360-degree video generation involves combining or merging video frames from adjacent cameras in the area where the video frames overlap or would otherwise connect. The result is an approximately spherical frame of video data. To integrate with existing video systems, the spherical frame of video data can be mapped to a planar format. For mapping techniques such as those used to generate Mercator projections can be used to produce an equirectangular format. As another example, the pixels in a merged video frame may be mapped onto the planes of a cube shape, or some other three-dimensional, planar shape (e.g., a pyramid, an octahedron, a decahedron, etc.). Video capture and video display devices operate on a raster principle—meaning that a video frame is treated as a grid of pixels—thus square or rectangular planes are typically used to represent a spherical environment.

360-degree video frames, mapped to a planar representation, can be encoded and/or compressed for storage and/or transmission. Encoding and/or compression can be accomplished using a video codec (e.g., a codec that is compliant with the High Efficiency Video Coding (HEVC) standard, which is also known as H.265, or a codec that is compliant with the Advanced Video Coding standard, which is also known as H.264, or another suitable coding standard), which results in a encoded and/or compressed video bitstream or group of bitstreams. Encoding of video data using a video codec is described in further detail below.

In some implementations, the encoded video bitstream(s) can be stored and/or encapsulated in a media format or file format. The stored bitstream(s) can be transmitted, for example, over a network, to a receiver device that can decode and render the video for display. Such a receiver device may be referred to herein as a video display device. For example, a 360-degree video system can generate encapsulated files from the encoded video data (e.g., using an International Standards Organization (ISO) base media file format and/or derived file formats).

For instance, the video codec can encode the video data and an encapsulation engine can generate the media files by encapsulating the video data in one or more ISO format media files. Alternatively or additionally, the stored bitstream(s) can be provided directly from a storage medium to a receiver device.

A receiver device can also implement a codec to decode and/or decompress an encoded video bitstream. In cases in which the encoded video bitstream(s) are stored and/or encapsulated in a media format or file format, the receiver device can support the media or file format that was used to pack the video bitstream into a file (or files), and can extract the video (and possibly also audio) data to generate the encoded video data. For example, the receiver device can parse the media files with the encapsulated video data to generate the encoded video data, and the codec in the receiver device can decode the encoded video data.

The receiver device can then send the decoded video signal to a rendering device (e.g., a video display device, player device, or other suitable rendering device). Rendering devices include, for example, head-mounted displays, virtual reality televisions, and other 180 or 360-degree display devices. Generally, a head-mounted display is able to track the movement of a wearer's head and/or the movement of a wearer's eyes. The head-mounted display can use the tracking information to render the part of a 360-degree video that corresponds to the direction in which the wearer is looking, so that the wearer experiences the virtual environment in the same way that she would experience the real world. A rendering device may render a video at the same frame rate at which the video was captured, or at a different frame rate.

Projections and mappings are used to represent three-dimensional (3-D) surfaces on two-dimensional (2-D) maps. For example, in 360-degree video applications, projections and mappings can be used to map a 360-degree video frame, which captures pixels in all directions from the camera and can thus be visualized as a sphere, onto a two-dimensional video frame. Examples of two-dimensional projections include an equirectangular (ERP) projection and a cube map (CMP) projection, among others. FIG. 1A illustrates a video frame 110 that includes an equirectangular projection of a 360-degree video frame. An equirectangular projection maps points on a sphere to a two-dimensional map by linearly mapping the latitude and longitude of the points on the sphere to (x, y) coordinates in the video frame 110. The equirectangular projection is able to include all pixels from the 360-degree video frame into the two-dimensional video frame 110, thus transitions from one area of the video frame 110 to another are seamless. Seamless transitions mean that an equirectangular video frame may encode efficiently, in terms of the size of the encoded video frame. This is because operations such as motion estimation and motion compensation produce better results when motion between video frames appears continuous.

Figure 1B:
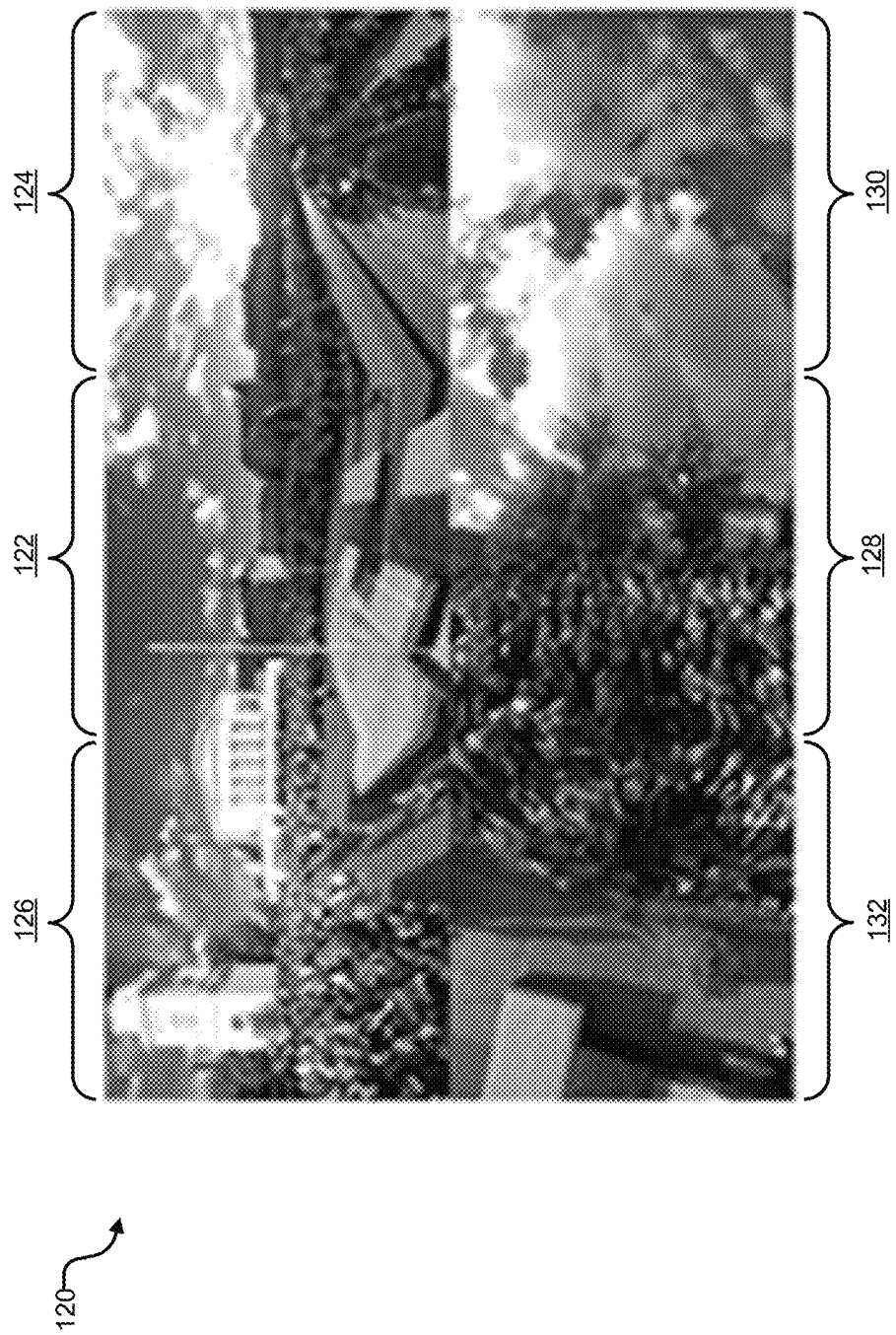
FIG. 1B illustrates a video frame that includes a cube map projection of a 360-degree video frame.

FIG. 1B illustrates a video frame 120 that includes a cube map projection of a 360-degree video frame. The cube map projection projects points on the surface of a sphere to points on planes that are tangent to the sphere surface. That is, the pixels are fitted onto the six faces of a cube, where the height, width, and length of the cube can be such that the cube fits within the sphere. The example of FIG. 1B is a 3×2 arrangement; that is, three cube faces across and two cube faces high. The 3×2 arrangement results in an aspect ratio which can encode efficiently. For example, less data per line of pixels needs to be stored than if an arrangement such as 1×2 is used.

In the example video frame 120 of FIG. 1B, a cube face that can be considered a forward front face 122 is placed in the middle of the upper half of the video frame 120. The cube faces to the right and left of the front face (e.g., a right face 124 and a left face 126) are placed on the right and left sides, respectively, of the upper half of the video frame 120. The cube face that can be considered the back face 128 is rotated −90 degrees and placed in the center of the lower half of the video frame 120. The cube face that can be considered the upward or top face 130 is placed to the right of the back face 128, and is also rotated so that the edge of the top face 130 matches the edge of the back face 128. The cube face that can be considered the down or bottom face 132 is placed to the left of the back face 128, rotated to match the edge of the back face 128.

In the example of FIG. 1B, the pixels included in the front face 122 were selected as the view to be placed directly in front of the viewer. In other examples, a different part of the video data can be selected to be the front view. Additionally, the arrangement of the cube faces illustrates in the example video frame 120 of FIG. 1B is one example arrangement. Other arrangements are also possible.

A cube map projection can be more compact than an equirectangular projection, due to some compressing of pixel data occurring at the edges of the cube faces. The cube map also produces less distortion of the image, which can improve coding efficiency.

Another projection is one referred to as the segmented sphere projection (SSP). The segmented sphere projection is described in Y. Ye, E. Alshina, and J. Boyce, "Algorithm descriptions of projection format conversion and video quality metrics in 360Lib", JVET-E1003, January 2017, which is hereby incorporated by reference, in its entirety and for all purposes. FIG. 2A is a diagram illustrating the segmented sphere projection of the surface of a sphere 202 to an example two-dimensional vertical mapping 210 generated according to the segmented sphere projection. The segmented sphere projection divides the sphere into three segments: a north pole segment 204, a south pole segment 208, and an equatorial segment 206. The north pole and south pole segments are also referred to herein as sphere poles or sphere pole segments. In the illustrated example, the three segments are divided at a latitude of 45 degrees north and 45 degrees south (e.g., as measures from the center of the sphere 202). In other examples, the three segments can be divided at a different degree of latitude.

In the example two-dimensional mapping 210 illustrated in FIG. 2A, the area covered by the north pole segment 204 is mapped to a first circular region, which will be referred to as a top view 214. Similarly, the area covered by the south pole segment 208 is mapped to a second circular region, which will be referred to as a bottom view 218. In this example, the bottom view 218 is placed in the mapping 210 next to, and below the top view 214. The top view 214 and the bottom view 21 are also labeled Face 0 and Face 1, respectively. The equatorial segment 206 is divided into four equal segments, and each segment is mapped to a square area, which are placed in the mapping 210 one below the other, below the bottom view 218. For purposes of this example, the square areas for the equatorial region 206, from top to bottom, will be referred to as the left view 216a, the front view 216b, the right view 216c, and the back view 216d or Face 2, Face 3, Face 4, and Face 5, respectively. In other examples, the left, right, front, and back views can be arranged in different orders than what is described here. In other examples, the areas into which the equatorial segment 206 is mapped may not be square. For example, when an angle other than 45 degrees is used to delineate the polar regions, rectangular areas that are not square may better fit the pixel data, and may result in less distortion than if, in this example, the data were mapped to square areas.

In a video application, pixels from each of the north pole segment 204 and the south pole segment 208 can be mapped to the circular regions of the top view 214 and the bottom view 218, respectively, using an angular projection commonly known as a fisheye projection. In this example, the diameter of the circular regions in each of the top view 214 and the bottom view 218 is the same as the edge of each of the equatorial segments, due to each view covering 90 degrees of latitude. Each of the left view 216a, front view 216b, right view 216c, and back view 216c can be generated using the projection used to generated the equirectangular projection, which can result in relatively smooth transitions between these views.

FIG. 2B is a diagram illustrating an example two-dimensional video frame 220 generated using a 3×2 arrangement of the mappings that can be generated using the segmented sphere projection. In the example video frame 220, the front view 216b is placed in the middle of the top half of the video frame 220. The left view 216a and the right view 216c are place to the left and right, respectively, of the front view 216b. The back view 216d is rotated −90 degrees and placed in the middle of the lower half of the video frame 220. Top view 212 is also rotated such that left edge of the top view is aligned with the right edge of the back view 216d, and placed to the right of the back view 216d. The bottom view 218 is also rotated, so that the right edge of the bottom view 218 aligns with the left edge of the back view 216d, and is placed to the left of the back view 216d. In this example, "aligns" means that at least a few pixels from each view that would be adjacent in the original sphere 202 are adjacent in the video frame 220. In this example, the corner areas of the top view 212 and the bottom view 218 that are outside of the fisheye projection are filled with a grey color. In other examples, these corner areas can be filled with another color.

The segmented sphere projection can generate video frames that have better coding efficiency than video frames generated using the equirectangular projection or the cube map projection. For example, less distortion and smoother transitions can result when using the segmented sphere projection, both of which can improve coding efficiency.

Even better coding efficiency can be achieved, however. For example, in the top and bottom views, the corner areas do not capture pixel data, and thus add data to a video frame that is not needed to when displaying the contents of the video frame. This extra data can, in some cases, also result in an encoded video frame that is larger than when a cube map projection is used, while providing the same number of active pixels.

The segmented sphere projection also introduces some new problems. For example, the circumference of the top and bottom views are shorter than the combined width of the left, front, right, and back views. This difference can result in a visible boundary, when the views are reassembled for display, between the north pole region and the equatorial region, and the equatorial region and the south pole region.

In various implementations, provided are systems and methods for processing 360-degree video data, using a segmented sphere projection, that avoids the problems discussed above. In various implementations, the segmented sphere projection can be used to map a 360-degree video frame to a two-dimensional, rectangular format, which can be easier for video transmitters and receivers to handle. In generating this mapping, the circular north pole and south pole regions of the segmented sphere projection can be expanded, using various techniques, to fill a rectangular region of the output video frame. By mapping the polar regions into all corners of a rectangular region, all available pixels in the output video frame can include usable data. Additionally, the perimeter of the top and bottom views can be made equal to the overall length of the combined left, front, right, and back views, thus reducing any distortion or artifacts at the boundaries with the top and bottom views. Furthermore, the additional pixels resulting from expanding the polar regions can result in denser sampling of pixels in the polar regions, and thus a more accurate representation in this areas.

As noted above, the equatorial region of the segmented sphere projection can be mapped to one or more square or rectangular areas of the output video frame using techniques such as those that can be used to generate an equirectangular projection. The equatorial region can also be mapped using other projections, such as cylindrical equal area projections. Use of cylindrical equal area projections are further discussed in U.S. application Ser. No. 15/926,732, filed on Mar. 20, 2018, which is incorporated herein by reference in its entirety.

Figure 3:
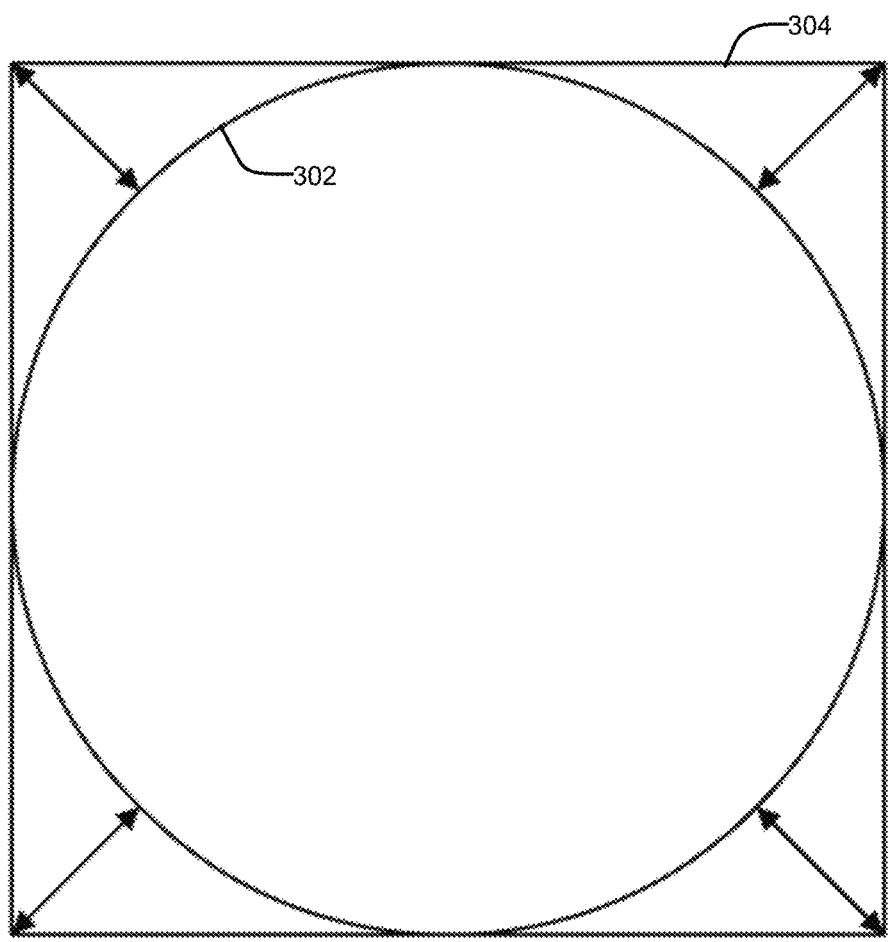
FIG. 3 is a diagram illustrating an example of the mapping of a circle to a square and a square to a circle.

To map the polar regions of the segmented sphere projection to square or rectangular areas of the output video frame, techniques for mapping a circular to a square can be used. FIG. 3 is a diagram illustrating an example of the mapping of a circle 302 to a square 304 and a square 304 to a circle 302. Various techniques can be used to accomplish these mappings, some of which are described in M. Lambers, "Mappings between Sphere, Disc, and Square," Journal of Computer Graphics Techniques, Vol. 5, No. 2, 2016, which is hereby incorporated by reference, in its entirety and for all purposes.

Figure 4:
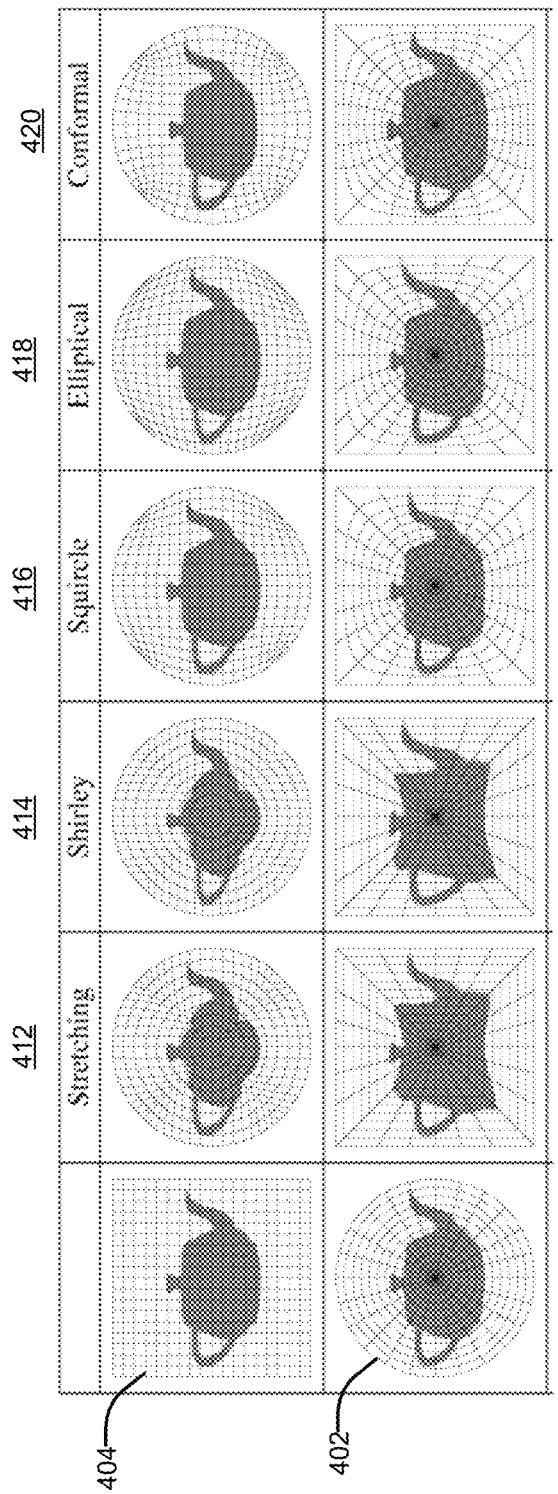
FIG. 4 is a diagram illustrating an example output for several techniques for mapping a square to a circle and a circle to a square.

FIG. 4 is a diagram illustrating example output for several techniques for mapping a square 404 to a circle and a circle 402 to a square. The illustrated techniques include radial stretching 412, Shirley's equal area mapping 414, Fernandez-Gausti's squircle mapping 416 (which will be referred to herein as the squircle mapping), elliptical arc mapping 418, and conformal mapping 420. These and other techniques can produce varying degrees of distortion in different parts of the output mapping. In a video application, techniques that result in the least amount of modification to the original image are used, such as the squircle mapping 416 or the elliptical arc mapping 418. Maintaining as much of the original image as possible can be advantageous to coding efficiency.

Though any of the techniques discussed in Lambers, and many other techniques, can be used to map a circle to a square, the squircle mapping and elliptical arc mappings will be used as examples to illustrate use of the segmented sphere projection to map 360-degree video data to a two-dimensional, rectangular format. In other examples, other square-to-circle mapping techniques can be used.

The squircle mapping provides a square-to-circle mapping using the following equations:

$$u = x\frac{\sqrt{x^2 + y^2 - x^2 y^2}}{\sqrt{x^2 + y^2}} \quad (1)$$

$$v = y\frac{\sqrt{x^2 + y^2 - x^2 y^2}}{\sqrt{x^2 + y^2}} \quad (2)$$

In equations (1) and (2), (x, y) are Cartesian coordinates within the square and (u, v) are Cartesian coordinates within the circle.

The elliptical arc mapping provides a square-to-circle mapping using the following equations:

$$u = x\sqrt{1 - \frac{y^2}{2}} \quad (3)$$

$$v = y\sqrt{1 - \frac{x^2}{2}} \quad (4)$$

Mapping a 360-degree video frame to a two-dimensional, rectangular format involves converting from the three-dimensional space of the 360-degree video data to the two-dimensional space of the output video frame. Executing this conversion can include selecting a pixel location, (m, n), in the output video frame, and determining a point (φ, θ) on the spherical video data. A pixel sample can be taken from the point designated by (φ, θ), and placed at point (m, n) in the output video frame.

In some examples, such as those discussed above, the polar regions of the spherical data can be mapped to a rectangular area of the output video frame. In these examples, the dimensions of the square can be denoted as A× A. In other examples, the length and width of the rectangular area may be different from one another.

Pixel locations in a video frame are most often given in raster order, with the zero-eth pixel position being in the top left corner of the video frame. Thus, a first step in converting from a 3-D space to a 2-D space is to renormalize the coordinates (m, n) in the video frame to Cartesian coordinates (x, y). This can be accomplished using the following equations:

$$x = \frac{2}{A}\left(m + \frac{1}{2}\right) - 1 \quad (5)$$

$$y = \frac{2}{A}\left(n + \frac{1}{2}\right) - 1 \quad (6)$$

In one example, equations (5) and (6) can be combined with the square-to-circle equations provided by the squircle mapping, to determine Cartesian coordinates (u, v) in a circle:

$$s = \frac{\sqrt{x^2 + y^2 - x^2 y^2}}{\sqrt{x^2 + y^2}} \quad (7)$$

$$u = \frac{A}{2}sx \quad (8)$$

$$v = \frac{A}{2}sy \quad (9)$$

In another example, equations (5) and (6) can be combined with the square-to-circle equations provided by the elliptical arc mapping to determine (u, v):

$$u = \frac{A}{2}x\sqrt{1-\frac{y^2}{2}} \quad (10)$$

$$v = \frac{A}{2}y\sqrt{1-\frac{x^2}{2}} \quad (11)$$

The next step is to determine three-dimensional polar coordinates that correspond to (u, v), as determined in either of the examples above, or using another method for a square-to-circle mapping. As illustrated in FIG. 2A, the three-dimensional polar coordinates include a radius, an equatorial angle φ (e.g., an angle along an equator of the sphere from a point selected to be degree zero), and a vertical angle θ (e.g., an angle between the equator and one of the poles). The polar coordinates for the north pole region (face 0 in the example of FIG. 2A), can be determined using the following equations:

$$\phi = \tan^{-1}\left(\frac{u}{v}\right) \quad (12)$$

$$\theta = \frac{\pi}{2}\left(1 - \frac{r}{A}\right) \quad (13)$$

The polar coordinates for the south pole region (face 1 in the example of FIG. 2A), can be determined using the following equations:

$$\phi = \tan^{-1}\left(\frac{u}{v}\right) + \frac{\pi}{2} \quad (14)$$

$$\theta = \frac{\pi}{2}\left(\frac{r}{A} - 1\right) \quad (15)$$

For both the north pole region and the south pole region, $r = \sqrt{u^2 + v^2}$.

Figure 5B:
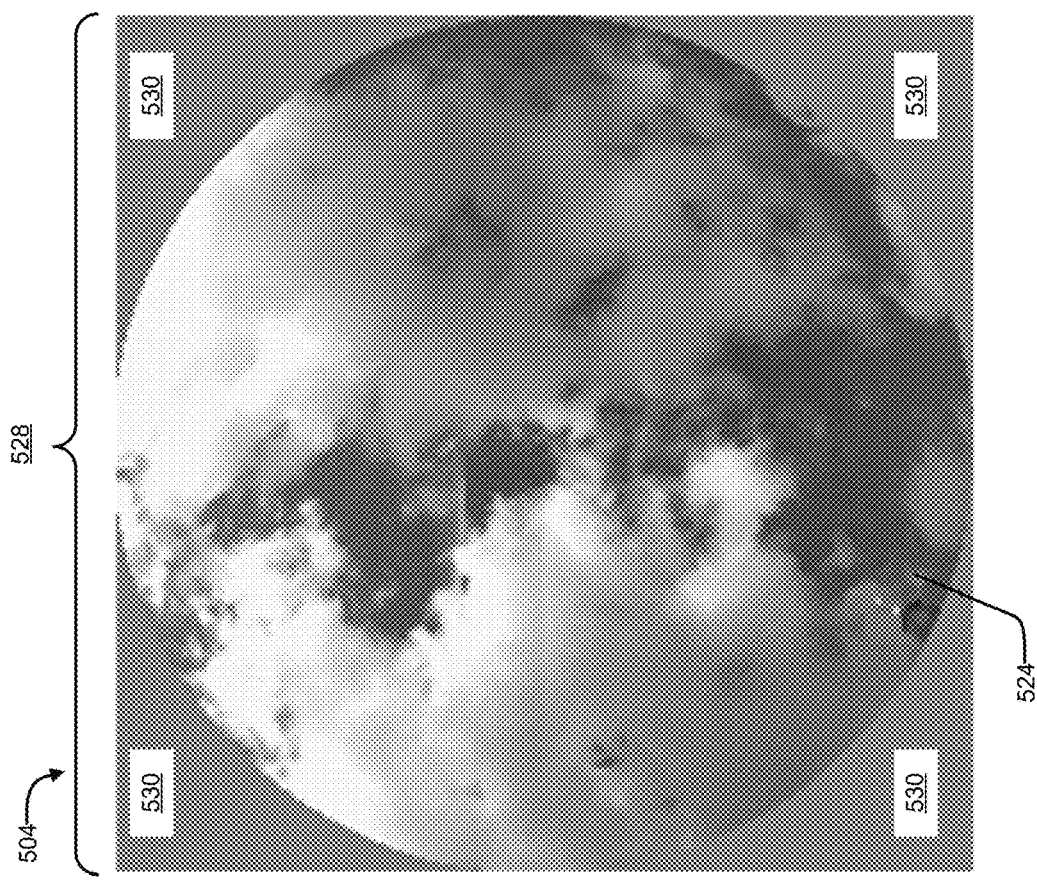
FIG. 5A and FIG. 5B are diagrams illustrating examples of the polar regions of a spherical video data that have been mapped using an angular fisheye projection.
Figure 5A:
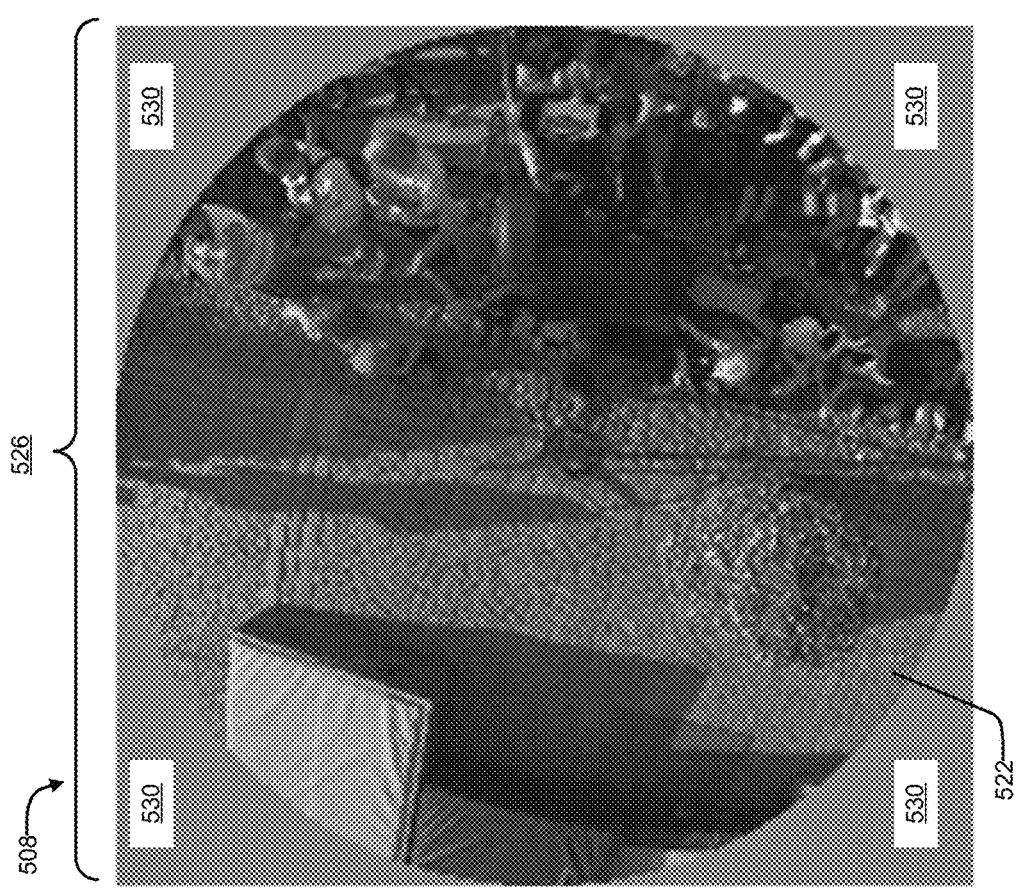

FIG. 5A and FIG. 5B are diagrams illustrating examples of the polar regions of a spherical video data that have been mapped using an angular fisheye projection, which can also be described as a circular pole mapping. FIG. 5A illustrates a bottom view 508, obtained by mapping the south pole region. FIG. 5B illustrates a top view 504, obtained by mapping the north pole region.

As discussed above, a fisheye projection results in the pixels of the north and south pole regions occupy a circular area 522, 524 within the square areas 526, 528 into which the pixels are mapped. The projection is able to preserve most of the data from the spherical video data, though some loss may occur due to the pixels being warped into the circular shape. Additionally, the each of the square regions have corner areas 530 where the pixels are filled with grey or some other value, rather than with pixel data from the spherical video data. When encoded, the corner areas 530 can reduce coding efficiency, due to having non-video data. Additionally, the corner areas 530 add unnecessary data, since the data from the corner areas 530 will be discarded when the video frame is reassembled for display.

Figure 6B:
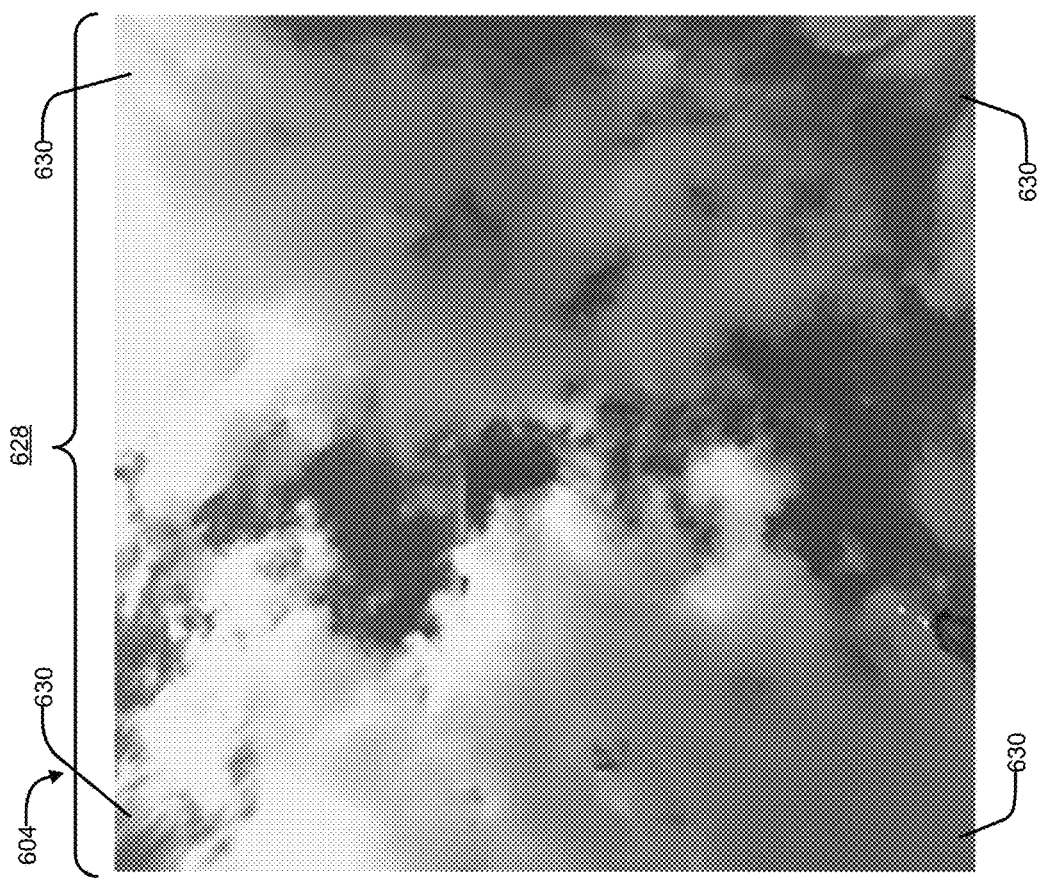
FIG. 6A and FIG. 6B are diagrams illustrating examples of the polar regions of a spherical video data that have been mapped using techniques discussed herein.
Figure 6A:
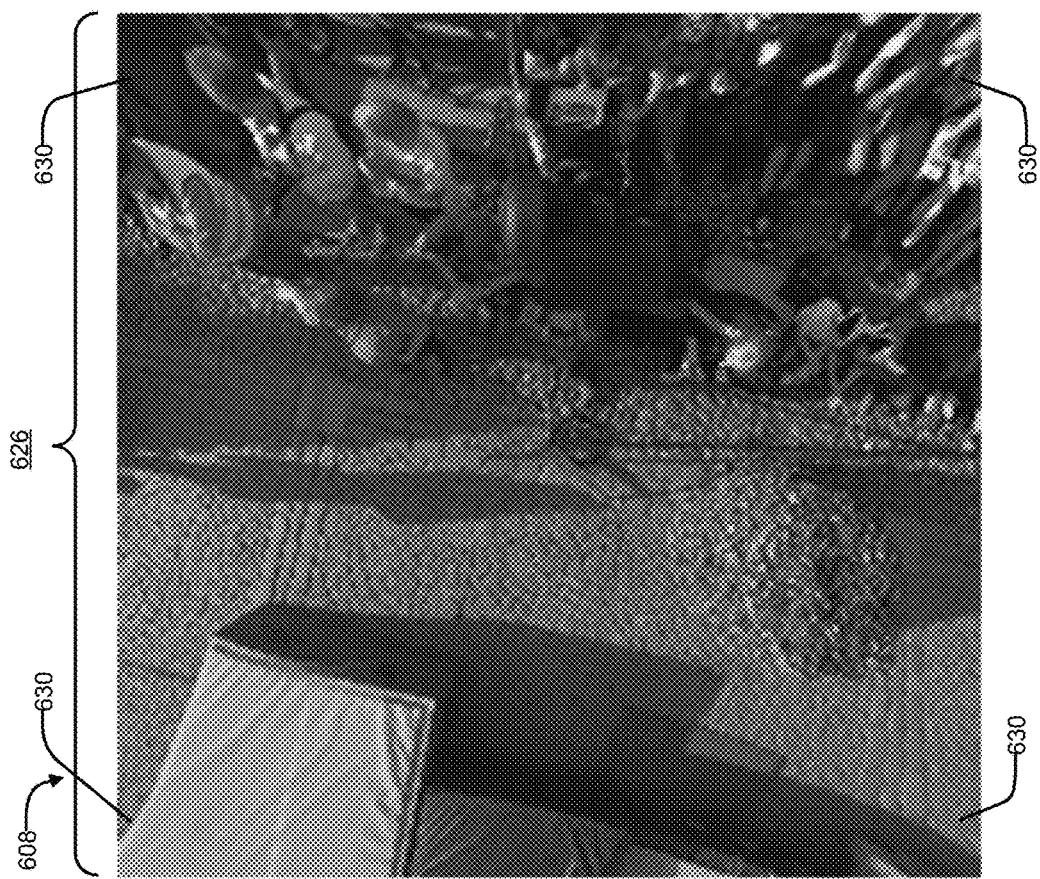

FIG. 6A and FIG. 6B are diagrams illustrating examples of the polar regions of a spherical video data that have been mapped using the equations discussed above. FIG. 6A illustrates a bottom view 608 and FIG. 6B illustrates a top view 604. The bottom view 608 and the top view 604 each start with the same data that was mapped to the views illustrated in FIG. 5A and FIG. 5B. In FIG. 6A and FIG. 6B, however, application of the above equations results in the data being stretched to fit the corner regions 630 of each square area 626, 628. In these examples, no unneeded data is added to the output video frame. Additionally, more pixel data from the spherical video data may be preserved by stretching the data into the corner regions 630, rather than warping the data into the circular region.

Figure 7:
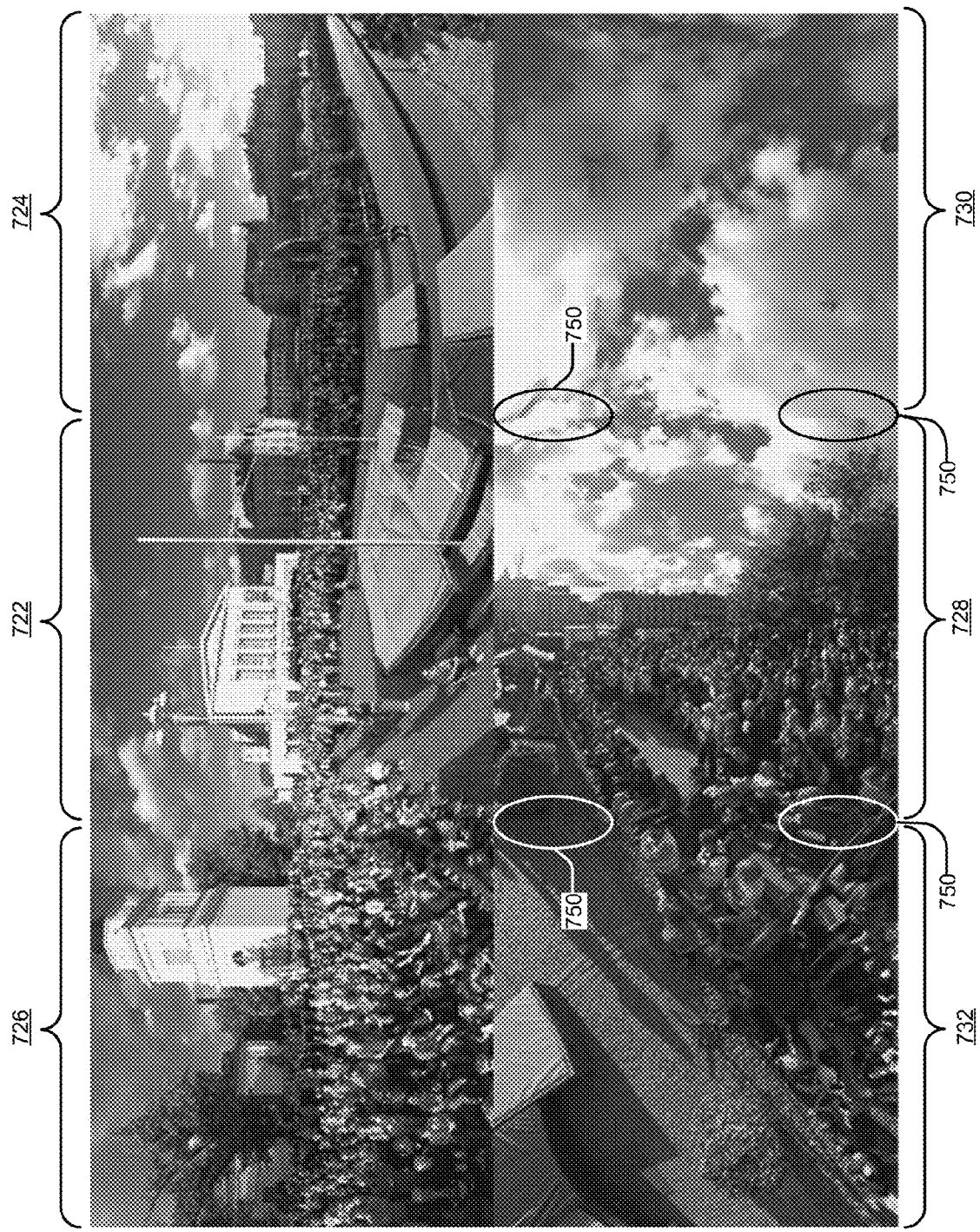
FIG. 7 illustrates an example of a video frame generated by mapping a 360-degree video frame using a segmented sphere projection and techniques discussed here.

FIG. 7 illustrates an example of a video frame 710 generated by mapping a 360-degree video frame using a segmented sphere projection and the equations discussed above. The example video frame 710 includes a 3×2 arrangement of the left, front, right, bottom, back, and top views. In the upper half of the video frame 710, the left view 726, front view 722, and right views 724 are arranged next to one another to form a continuous region. In the bottom half of the video frame 710, the back view 728 is rotated −90 degrees and is placed in the middle. In this example, the data for the top view 730 is rotated by 45 degrees before being mapped to the square area to the right of the back view 728. The bottom view 732 is similarly rotated 45 degrees before being mapped to the square area to the left of the back view 728.

The arrangement of the bottom view 732, back view 728, and top view 730 in the lower half of the video frame 710 results in a quasi-continuous region. Smooth transitions between each view is desirable because encoding of the video frame can result in a more compact encoded representation than when the transitions are abrupt. In other examples other arrangements of the views can be used, such as a 1×6 arrangement or a 6×1 arrangement. Alternatively or additionally, in other examples, the top and bottom views can be placed in the top or the bottom of the video frame 710, on the left or the right, or in some other part of the video frame 710. Alternatively or additionally, other rotations of the top and bottom views can be applied before the top and bottom views are mapped to the video frame, to achieve different quasi-continuous regions.

Continuity between the pixels in the video frame 710 can result in better coding efficiency, and can also reduce the occurrence of artifacts or visible defects when the video frame 710 is projected for display. In the example video frame 710 of FIG. 7, some discontinuity is evident where the corner regions 750 of the top view 730 and the bottom view 732 meet the back view 728. This discontinuity may be due to the different methods being used to produce the back view 728 and the top and bottom views, and/or the differences in the shape of the data being taken from the spherical video frame.

The discontinuity caused by the corner regions 750 can be reduced by gradually and continuously adjusting the sampling of the pixels from the spherical video data. Taking, for example, top view 730, samples can be taken from the spherical data in gradual fashion from the edge adjacent to the back view 728 towards (in this example) the right of the top view 730. Additionally, the sampling adjustment can be applied more towards the outside edges of the top view 730 (e.g., towards the corner regions 750) than towards the middle, where discontinuity with the back view is less evident. The same adjustments can be applied when mapping the bottom view 732.

In various implementations, gradual sampling of the pixels includes adjusting the 2-D to 3-D conversion discussed above. For example, the Cartesian coordinates (x, y) that correspond to a point (m, n) selected in the video frame can be determined using the following equations:

$$x = \frac{2}{A}\left(m + \frac{1}{2}\right) - 1 \qquad (16)$$

$$y = \frac{2}{A}\left(n + \frac{1}{2}\right) - 1 \qquad (17)$$

As before, A is the length of the side of the square area into which the spherical video data is being mapped.

For the top view (e.g., face 0), x-coordinate can be adjusted according to the following equations:

$$x' = 1 + \tanh\left(\frac{-y-1}{b}\right) \qquad (18)$$

$$x = \tan(\tan^{-1}(x')x)/x' \qquad (19)$$

For the back view (e.g., face 1), the x-coordinate can be adjusted according to the following equations:

$$x' = 1 + \tanh\left(\frac{y-1}{b}\right) \qquad (20)$$

$$x = \tan(\tan^{-1}(x')x)/x') \qquad (21)$$

In the above equations, b is a parameter that can be used to vary the amount by which the pixel sampling changes from the edge of the top or bottom view towards the middle of the view. Selecting a value for b is discussed further below. In some examples, a value of 0.2 for b reduces the discontinuity between the back view and the top view without significantly affecting the sampling of the pixels in the central area of the top view.

Note that in the example of FIG. 7, because the back view 728 is rotated −90 degrees, the x-axis is in the up-and-down direction and the y-axis in the left-to-right direction.

In various implementations, the y-coordinate is not adjusted, as is determined according to equation (17). Additionally, the hyperbolic tangent function is used as one example of a function that produces a gradual transition between 0 and 1. In other examples, other functions, such as sine, polynomial functions, or other functions that produce a gradual transition can be used.

Figure 8:
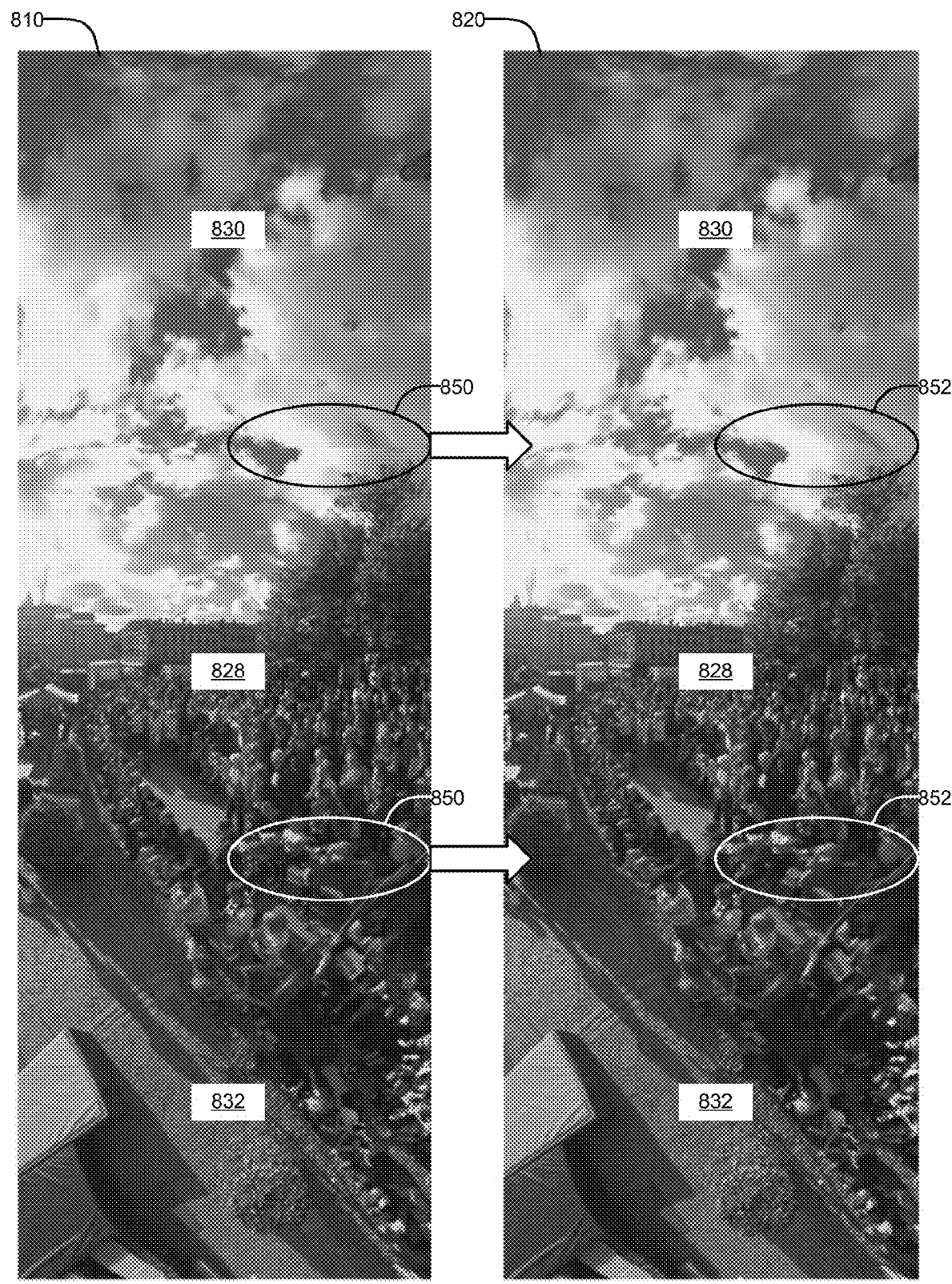
FIG. 8 illustrates an example of a first partial video frame that was mapped without using the gradual transition technique discussed above, and a second partial video frame that was mapped according to the gradual transition technique.

In various implementations, the adjusted x value and the y value can further be used in the square-to-circle mapping discussed above. FIG. 8 illustrates an example of a first partial video frame 810 that was mapped without using the gradual transition technique discussed above, and a second partial video frame 820 that was mapped according to the gradual transition technique. In this example, a top view 830 appears at the top of each partial video frame, a bottom view 832 is at the bottom of the partial video frames, and a back view 828 is in the middle.

In the first partial video frame 810, by way of example, several discontinuities 850 are circled. These discontinuities 850 occur where the top view 830 and the bottom view 832 meet the back view 828. The discontinuities 850 appear as a horizontal line, which may be present when the video frame is presented for display.

In the second partial video frame 820, the area of discontinuity 852 is also highlighted, but due to the adjusted x-coordinate equation having been used to map the top view 830 and the bottom view 832, the discontinuity is less evident.

Note that, in this example, the x-axis is in the horizontal direction. Also note that, in this example, the adjustment to the x-coordinate is only applied where the top view 830 and the bottom view 832 meet the back view 828, and not at the top and bottom edges of the second partial video frame 820. In other examples, the adjustment can be applied at the top and bottom edges of the frame as well.

As noted above, a parameter b is used in equations (18) and (19) to adjust to degree to which the x-coordinate changes as x decreases or increases. A larger value for b can result in a more abrupt transition from, for example, the back view to the top view (resulting in a possibly visible discontinuity), and a smaller value for b can result in a smoother transition. A small value for b, however, can cause more pixels towards the center of the view to be affected. Limiting modification of the pixels in the center of the view may be desirable, because keeping these pixels as close as possible to the orientation of the pixels in the spherical video data can result in both better coding efficiency and a better appearance when the video frame is displayed.

Figure 9:
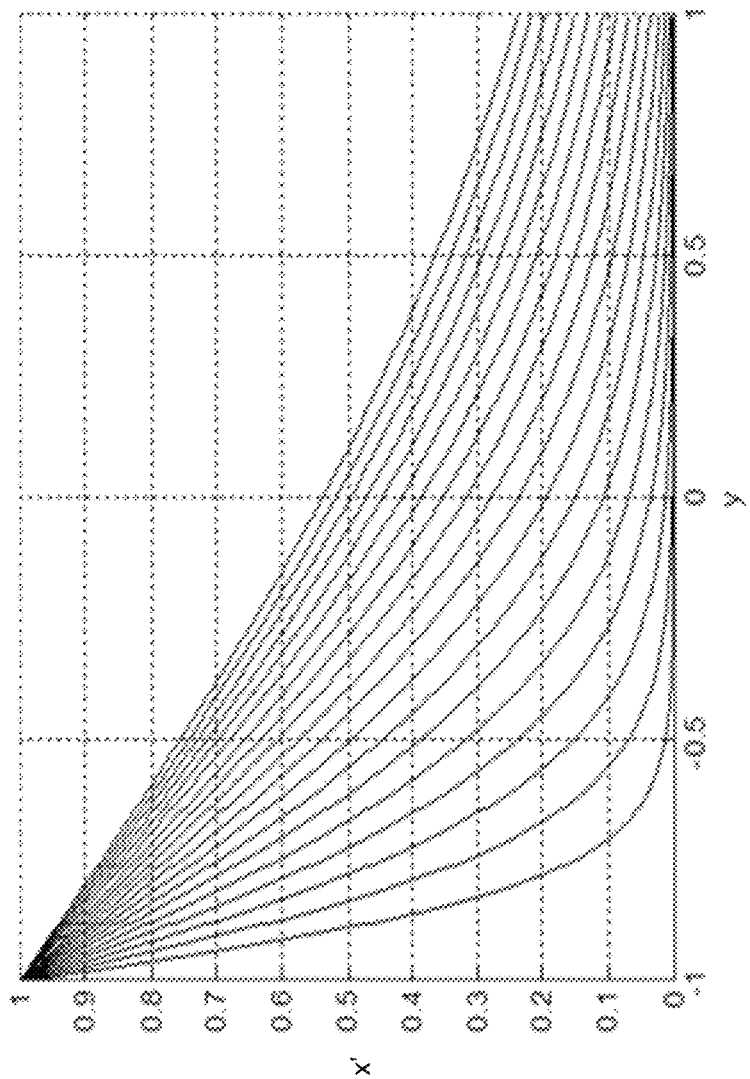
FIG. 9 illustrates a graph onto which outputs of a function have been plotted.

As an example of the effect of different values for b, FIG. 9 illustrates a graph 900 on which (x', y) is plotted according to equation (18) with different values of b. Where the top view meets the back view, y=−1, and the edge of the top view that is opposite the back view is at y=1. At x'=0, the gradual sampling is disabled, meaning, for example, the squircle or elliptical arc mapping applies. At x'=1, sampling that mathematically matches the sampling of the edge of the back view occurs. The leftmost plot in the graph 900 is for b=0.2. Each successive plot, moving from left to right, increases b by 0.1. The rightmost plot is for b=2.0.

As can be seen from the example illustrated in FIG. 9, as b increases, the sampling adjustment affects more and more of the mapping for the top view, until all pixels in the view are affected. As noted previously, modifying samples in the middle area of the view may adversely affect the coding efficiency of the output video frame. At lower values of b, however, the change toy falls off quickly, resulting in the adjustment being limited to a certain area.

A video frame produced according to the techniques discussed above can be encoded for storage and/or transmission. The video frame can subsequently be decoded for display. To display the video frame, the pixels in the video frame can be mapped from the two-dimensional arrangement of the video frame back to a three-dimensional representation, for example as spherical data. The reconstructed spherical data can then be displayed, for example, using a virtual reality capable display device.

To reconstruct the spherical video data, inverse operations from those used to map the video frame can be applied. For example, the left, front, right, and back views from the video frame can be mapped back to the equatorial region of the segmented sphere projection using, for example, the inverse of the projection used to generate an equirectangular projection. The top and bottom views can be mapped back to the north and south pole regions by selecting a point (φ, θ) on the sphere (e.g., a horizontal angle and a vertical angle; the radius will be constant), and determining a corresponding point (m, n) in the video frame. A pixel sampled from the point (m, n) can then be placed at (φ, θ).

In the examples that follows, the circle-to-square mappings provided by the squircle mapping and the elliptical arc mapping will be used as examples of techniques that can be used to convert the pixel data stored in a square area of the video frame into a circular area. In other examples, other circle-to-square mapping techniques can be used.

For the top view (e.g., face 0), $$\theta \in \left(\frac{\pi}{4}, \frac{\pi}{2}\right] \text{ and } \phi \in (-\pi, \pi].$$

To convert from polar coordinates ($\phi$, $\theta$) to Cartesian coordinates (u, v), the following equations can be used for the top view:

$$u = \frac{\left(\frac{\pi}{2} - \theta\right)\sin\phi}{\frac{\pi}{4}} \quad (22)$$

$$v = \frac{\left(\frac{\pi}{2} - \theta\right)\cos\phi}{\frac{\pi}{4}} \quad (23)$$

For the bottom view (e.g., face 1), $$\theta \in \left(-\frac{\pi}{2}, -\frac{\pi}{4}\right] \text{ and } \phi \in (-\pi, \pi].$$

To convert from polar coordinates ($\phi$, $\theta$) to Cartesian coordinates (u, v), the following equations can be used for the bottom view:

$$u = \frac{\left(\frac{\pi}{2} + \theta\right)\sin\phi}{\frac{\pi}{4}} \quad (24)$$

$$v = -\frac{\left(\frac{\pi}{2} + \theta\right)\cos\phi}{\frac{\pi}{4}} \quad (25)$$

Next, given a point (u, v), a corresponding location (x, y) in the video can be determined. As a first example, the squircle mapping provides the follow equations for performing a circle-to-square mapping:

$$w = \frac{\text{sgn}(uv)}{\sqrt{2}}\sqrt{u^2 + v^2 - \sqrt{(u^2 + v^2)(u^2 + v^2 - 4u^2v^2)}} \quad (26)$$

$$(x, y) = \begin{cases} \left(\frac{w}{v}, \frac{w}{u}\right) & \text{if } |w| > 0 \\ (u, v), & \text{otherwise} \end{cases} \quad (27)$$

In equation (26), sgn is the sign function.

As a second example, the elliptical arc mapping provides the following equations for performing a circle-to-square mapping:

$$x = \tfrac{1}{2}\sqrt{2+u^2-v^2+2\sqrt{2}u} - \tfrac{1}{2}\sqrt{2+u^2-v^2-2\sqrt{2}u} \quad (28)$$

$$y = \tfrac{1}{2}\sqrt{2-u^2+v^2+2\sqrt{2}v} - \tfrac{1}{2}\sqrt{2-u^2+v^2-2\sqrt{2}v} \quad (29)$$

Lastly, the (x, y) coordinates can be de-normalized to the coordinate system of the video frame. As noted above, (x, y) are Cartesian coordinates, while the video frame may use the upper left hand corner as point (0, 0). Conversion to the coordinates (m, n) of the video frame can be determined using the following equations:

$$m = \frac{A}{2}(x+1) - 0.5 \quad (30)$$

$$n = \frac{A}{2}(y+1) - 0.5 \quad (31)$$

A location (m, n) determined using either the squircle mapping or the elliptical arc mapping (or another technique) can be used to select a pixel from the video frame. The pixel can then be mapped to the point ($\phi$, $\theta$) on the spherical representation of the video frame.

In various implementations, gradual adjustment of some parts of the video frame may have been applied to reduce visible distortion that is caused by pixels not aligning at the boundaries between views. For example, the gradual adjustment may have been performed using the techniques discussed above. In these examples, the x-coordinate can be adjusted prior to converting (x, y) to (m, n), using the following equations:

$$x' = 1 + \tanh\left(\frac{-y-1}{b}\right) \quad (32)$$

$$x = \tan^{-1}(x'x)/\tan^{-1}(x') \quad (33)$$

As noted previously, a video frame generated using a combination of the segmented sphere mapping and a squircle or elliptical arc mapping can encode more efficiently than a video frame generated using the segmented sphere mapping alone. For instance, for the same number of two-dimensional map samples, the squircle mapping can outperform the segmented sphere projection by approximately 1% per common test conditions, as described in J. Boyce, E. Alshina, A. Abbas, Y. Ye, "JVET common test conditions and evaluation procedures for 360-degree video", JVET-E1030, which is hereby incorporated by reference, in its entirety and for all purposes.

FIG. 10 is a flow diagram illustrating an example of a process 1000 for processing video data according to the techniques discussed above. At 1002, the process 1000 includes obtaining 360-degree video data including a plurality of video frames, each video frame of the plurality of video frames including a spherical representation of video data for the video frame. In some examples, the 360-degree video data can be obtained directly from a video capture device. In these examples, the spherical representation can include multiple pictures that were captured simultaneously, such as multiple rectangular pictures or one or more fisheye pictures. Alternatively or additionally, the 360-degree video data can include video frames in which multiple pictures that have been stitched together by the video capture device or another device. In some examples, the 360-degree video data obtained in a rectangular format (e.g., an equirectangular or cube map format) can be mapped to a spherical representation.

At 1004, the process 1000 includes segmenting a video frame from the plurality video frames into a top region, a middle region, and a bottom region. The top region includes a first circular area of the spherical representation. The bottom region includes a second circular area of the spherical representation that is opposite on the spherical representation from the first circular area. The middle region includes an area of the spherical representation not included in the top region or the bottom region. The video frame can be segmented at a first latitude above an equator of the spherical representation and a second latitude below the equator. The first latitude and the second latitude can be equidistant from the equator. In some examples, the angle of the latitudes is 45 degrees from the equator. In other examples, the angle of the latitudes is greater or less than 45 degrees.

In some implementations, the process 1000 includes mapping the middle region to one or more rectangular areas of an output video frame. Mapping the middle region can include, for example, selecting a pixel location in the output video frame and determining a point on the spherical representation corresponding to the pixel location. In this example, the point on the spherical representation can be determined using a mapping for converting a two-dimensional rectangle to a three-dimensional sphere, such as an equirectangular projection. Mapping the middle region can further include sampling a pixel at the point on the spherical representation, and placing the sampled pixel at the pixel location in the video frame.

At 1006, the process 1000 includes mapping the top region into a first rectangular area of the output video frame. Mapping the top region can include expanding video data included in the first circular area to fill the first rectangular area, such that the first rectangular area has no pixel locations that do not include pixels from the video frame.

At 1008, the process 1000 includes mapping the bottom region into a second rectangular area of the output video frame. Mapping the bottom region can include expanding video data included the second circular area to fill the second rectangular area.

Mapping the top region and mapping the bottom region can include, for example, selecting a pixel location in the output video frame and determining a point on the spherical representation corresponding to the pixel location. In this example, the point on the spherical representation can be determined using a mapping for converting from a square to a circle, such as a squircle mapping or an elliptical arc mapping, or another mapping. Mapping the top and bottom regions can further include sampling a pixel from the point on the spherical representation, and placing the sampled pixel at the pixel location in the output video frame.

In some examples, the mapping for converting a square to a circle minimizes distortion in the output video frame. In these examples, the central area of the first and second rectangular areas include a direct mapping from the spherical representation to the output video frame, such that little distortion results in this area.

In some examples, mapping the top and bottom regions can further include adjusting the pixel location using a gradual curve function. The gradual curve function can be used, for example, at pixel locations in an area adjacent to at least one of the one or more rectangular areas. For example, where the first rectangular area is adjacent to another rectangular area (e.g., one of the rectangular areas for the middle region), the gradual curve function can be applied. As another example, where the second rectangular area is adjacent to another rectangular area, the gradual curve function can be applied. Application of the gradual curve function can reduce distortion that may appear where the first and second rectangular areas meet other rectangular areas in the video frame. The gradual curve function can change pixel locations less towards a middle area of the first rectangular area or the second rectangular area, and more towards an outside area of the first rectangular area or the second rectangular area. Examples of gradual curve functions include hyperbolic tangent, sine, polynomial functions, and other functions.

In some examples, the middle region includes parts that can be designated a left view, a front view, and a right view. In these examples, the part designated as the left view can be placed in the output video frame adjacent to the part designated as the front view. Additionally, the part designated as the right view is placed adjacent to front view. In these examples, the left, front, and right views can form a continuous area in the output video frame, where continuous means that pixels that are adjacent in the spherical representation are placed adjacent to one another in the output video frame.

In some examples, the middle region includes a part that can be designated as a back view. In these examples, the bottom region can be placed in the output video frame adjacent to part designated as the back view, and the top region can also placed adjacent to the back view. In these examples, the bottom region and the top region can form an area in the output video frame that is substantially continuous.

In some examples, mapping the top region into the first rectangular area can include applying a gradual adjustment in an area where the first rectangular area is adjacent to a rectangular area from the one or more rectangular areas. For example, where the first rectangular area is adjacent to another rectangular area, pixels sampled from the spherical video data can be shifted to better align with the pixels from the other rectangular area. This gradual adjustment can be gradually decreased for pixel locations that are further away from the edge of the first rectangular area. In some examples, the same gradual adjustment can be applied to the second rectangular area.

In some examples, the output video frame has a three-by-two aspect ratio. A three-by-two aspect ratio may encode more efficiently than other aspect ratios. In some examples, the output video frame can be encoded, using, for example, the HEVC or AVC codec (or another codec) for storage and/or transmission.

FIG. 11 is a flow diagram illustrating an example of a process 1100 for processing video data according to the techniques discussed above. At 1102, the process 1100 includes obtaining 360-degree video data including a plurality of video frames, each video frame from the plurality of video frames including a two-dimensional representation of video data for the video frame. In some examples, the 360-degree video data can be obtained from an encoded bitstream. The encoded bitstream may have been read from a storage location, and/or may have been received from a transmission. In these examples, the bitstream can be decoded into rectangular video frames.

At 1104, the process 1100 includes identifying a first rectangular area of a video frame from the plurality of video frames. At 1106, the process 1100 includes mapping the first rectangular area into a top region of a spherical representation of video data for the video frame, The top region can comprise a first circular area of the spherical representation. Mapping the first rectangular area can include arranging video data from the first rectangular area into the first circular area.

At 1108, the process 1100 includes identifying a second rectangular area of the video frame. At 1110, the process 1100 includes mapping the second rectangular area into a bottom region of the spherical representation. The bottom region can comprise a second circular area of the spherical representation. Mapping the second rectangular area can include arranging video data from the second rectangular area into the second circular area.

The top region can include, for example, a surface of the spherical representation that is above a first latitude of the spherical representation. As a further example, the bottom region can include a surface of the spherical representation below a second latitude of the spherical representation. In this example, the first latitude and the second latitude can be equidistant from an equator of the spherical representation. In some examples, the latitudes are at 45 degrees from the equator. In some examples, the latitudes are degrees that are greater than or less than 45 degrees.

In some examples, mapping the first rectangular area and mapping the second rectangular area includes selecting a point on the spherical representation, and determining a pixel location in the video frame that corresponds to the point. The pixel location can be determined using a mapping for converting a circle to a square, such as a squircle mapping, an elliptical arc mapping, or another mapping. Theses mapping can result in a circle being compressed or morphed into a square. Mapping the first and second rectangular areas can further include sampling a pixel from the pixel location, and placing the sampled pixel at the point on the spherical representation.

In some examples, the mapping for converting a circle to a square reverses distortion caused when video data in the first rectangular area or the second rectangular area was expanded to fill the first rectangular area or the second rectangular area. For example, the first and second rectangular areas may have been filled with pixel data by converting a circular region of a spherical representation of the 360-degree video into a rectangular region, which may result in some visible distortion of the pixels. By mapping the pixels from a rectangular shape back to a circular shape, the distortion may be removed.

In some examples, mapping the first rectangular area and mapping the second rectangular area further includes adjusting the pixel location using a gradual curve function. For example, the gradual curve function can be used at pixel locations in an area adjacent to at least one of the one or more additional rectangular areas. In these examples, a continuous transition between pixels adjacent to the first or second rectangular areas and pixels in the first or second rectangular areas can be preserved when the pixels are mapped to the spherical representation. In some examples, the gradual curve function changes pixel locations less towards a middle area of the first rectangular area or the second rectangular area, and more towards an outside area of the first rectangular area or the second rectangular area.

In some implementations, the process 1100 includes mapping one or more additional rectangular areas of the video frame into a middle region of the spherical representation. Mapping the one or more additional rectangular areas can include, for example, selecting a point on spherical representation, and determining a pixel location in the video frame that corresponds to the point. The pixel location can be determined using a mapping for converting a three-dimensional sphere to a two-dimensional rectangle, such as an equirectangular projection, a cube map projection, or another projection. Mapping the one or more additional rectangular areas can further include sampling a pixel from the pixel location, and placing the sampled pixel at the point on the spherical representation.

In some examples, the one or more additional rectangular areas include areas that can be designated as a left view, a front view and a right view. In these examples, the area designated as the left view can be located adjacent to the area designated as the front view, and the area designated as the right view can also be located adjacent to the front view. In these examples, the left, front, and right views can form a continuous area in the video frame.

In some examples, the one or more additional rectangular areas include an area that can be designates as a back view. In these examples, the first rectangular area can be adjacent to the area designated as the back view, and the second rectangular area can also be adjacent to the back view. In these examples, the first rectangular area, the back view, and the second rectangular area can form a continuous area in the video frame.

In some examples, mapping the first rectangular area into the top region can include applying a gradual adjustment in an area where the first rectangular area is adjacent to another rectangular area. In these examples, a the pixel locations in the video frame may have been shifted, so that a continuous transition between the first rectangular area and the other rectangular area is produced. This continuous transition can be preserved in the spherical representation by applying gradual adjustment when the pixels are mapped from the video frame to the spherical representation. A similar gradual adjustment can also be applied to the second rectangular area.

In some examples, the processes 1000, 1100 may be performed by a computing device or an apparatus, such as a video coding device (e.g., encoding device 104 and/or decoding device 112). A video coding device can include, for example, a video encoding system and/or a video decoding system. In some cases, the computing device or apparatus may include a processor, microprocessor, microcomputer, or other component of a device that is configured to carry out the steps of processes 1000, 1100. In some examples, the computing device or apparatus may include a camera configured to capture video data (e.g., a video sequence) including video frames. For example, the computing device may include a camera device (e.g., an IP camera or other type of camera device) that may include a video codec. In some examples, a camera or other capture device that captures the video data is separate from the computing device, in which case the computing device receives the captured video data. The computing device may further include a network interface configured to communicate the video data. The network interface may be configured to communicate Internet Protocol (IP) based data.

The processes 1000, 1100 is illustrated as logical flow diagrams, the operation of which represent a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the processes 1000, 1100 may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

The video data captured by a camera (e.g., a fisheye camera, or other suitable camera or cameras) can be coded to reduce the amount of data needed for transmission and storage. Coding techniques may be implemented in an example video encoding and decoding system. In some examples, a system includes a source device that provides encoded video data to be decoded at a later time by a destination device. In particular, the source device provides the video data to destination device via a computer-readable medium. The source device and the destination device may comprise any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or the like. In some cases, the source device and the destination device may be equipped for wireless communication.

A video coding system, including an encoding system and/or a decoding system, can be used to encode and/or decode video data. An example video encoding and decoding system includes a source device that provides encoded video data to be decoded at a later time by a destination device. In particular, the source device provides the video data to the destination device via a computer-readable medium. The source device and the destination device may comprise any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming devices, or the like. In some cases, the source device and the destination device may be equipped for wireless communication.

The destination device may receive the encoded video data to be decoded via the computer-readable medium. The computer-readable medium may comprise any type of medium or device capable of moving the encoded video data from source device to destination device. In one example, computer-readable medium may comprise a communication medium to enable source device to transmit encoded video data directly to destination device in real-time. The encoded video data may be modulated according to a communication standard, such as a wireless communication protocol, and transmitted to destination device. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device to destination device.

In some examples, encoded data may be output from output interface to a storage device. Similarly, encoded data may be accessed from the storage device by input interface. The storage device may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, the storage device may correspond to a file server or another intermediate storage device that may store the encoded video generated by the source device. The destination device may access stored video data from the storage device via streaming or download. The file server may be any type of server capable of storing encoded video data and transmitting that encoded video data to the destination device. Example file servers include a web server (e.g., for a website), an FTP server, network attached storage (NAS) devices, or a local disk drive. The destination device may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from the storage device may be a streaming transmission, a download transmission, or a combination thereof.

The techniques of this disclosure are not necessarily limited to wireless applications or settings. The techniques may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications. In some examples, system may be configured to support one-way or two-way video transmission to support applications such as video streaming, video playback, video broadcasting, and/or video telephony.

In one example the source device includes a video source, a video encoder, and a output interface. The destination device may include an input interface, a video decoder, and a display device. The video encoder of the source device may be configured to apply the techniques disclosed herein. In other examples, a source device and a destination device may include other components or arrangements. For example, the source device may receive video data from an external video source, such as an external camera. Likewise, the destination device may interface with an external display device, rather than including an integrated display device.

The example system above is merely one example. Techniques for processing video data in parallel may be performed by any digital video encoding and/or decoding device. Although generally the techniques of this disclosure are performed by a video encoding device, the techniques may also be performed by a video encoder/decoder, typically referred to as a "CODEC." Moreover, the techniques of this disclosure may also be performed by a video preprocessor. The source device and the destination device are merely examples of such coding devices in which the source device generates coded video data for transmission to the destination device. In some examples, the source and destination devices may operate in a substantially symmetrical manner such that each of the devices include video encoding and decoding components. Hence, example systems may support one-way or two-way video transmission between video devices, e.g., for video streaming, video playback, video broadcasting, or video telephony.

The video source may include a video capture device, such as a video camera, a video archive containing previously captured video, and/or a video feed interface to receive video from a video content provider. As a further alternative, the video source may generate computer graphics-based data as the source video, or a combination of live video, archived video, and computer-generated video. In some cases, if the video source is a video camera, the source device and the destination device may form so-called camera phones or video phones. As mentioned above, however, the techniques described in this disclosure may be applicable to video coding in general, and may be applied to wireless and/or wired applications. In each case, the captured, pre-captured, or computer-generated video may be encoded by the video encoder. The encoded video information may then be output by output interface onto the computer-readable medium.

As noted, the computer-readable medium may include transient media, such as a wireless broadcast or wired network transmission, or storage media (that is, non-transitory storage media), such as a hard disk, flash drive, compact disc, digital video disc, Blu-ray disc, or other computer-readable media. In some examples, a network server (not shown) may receive encoded video data from the source device and provide the encoded video data to the destination device, e.g., via network transmission. Similarly, a computing device of a medium production facility, such as a disc stamping facility, may receive encoded video data from the source device and produce a disc containing the encoded video data. Therefore, the computer-readable medium may be understood to include one or more computer-readable media of various forms, in various examples.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Figure 12:
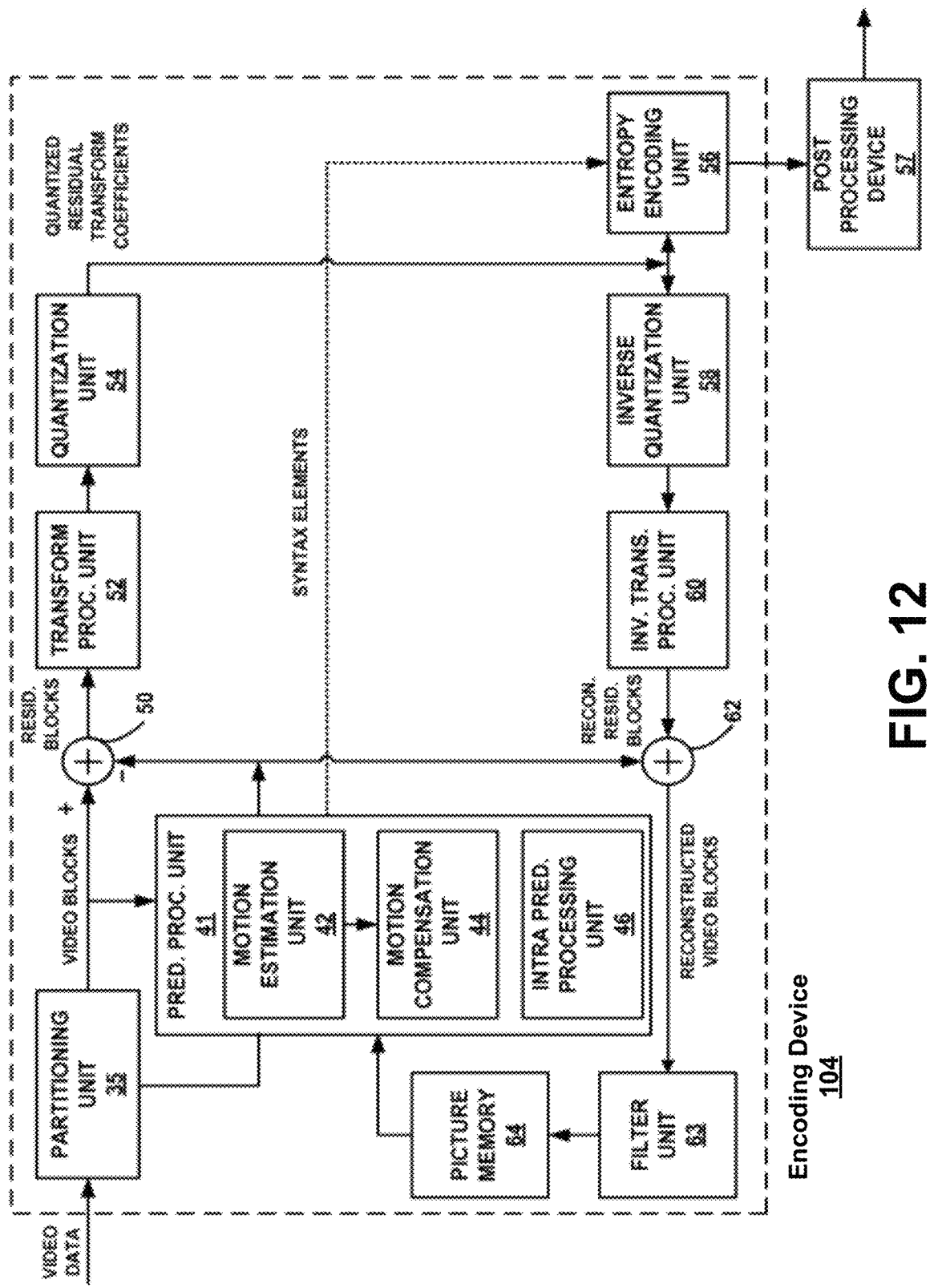
FIG. 12 is a block diagram illustrating an example encoding device.
Figure 13:
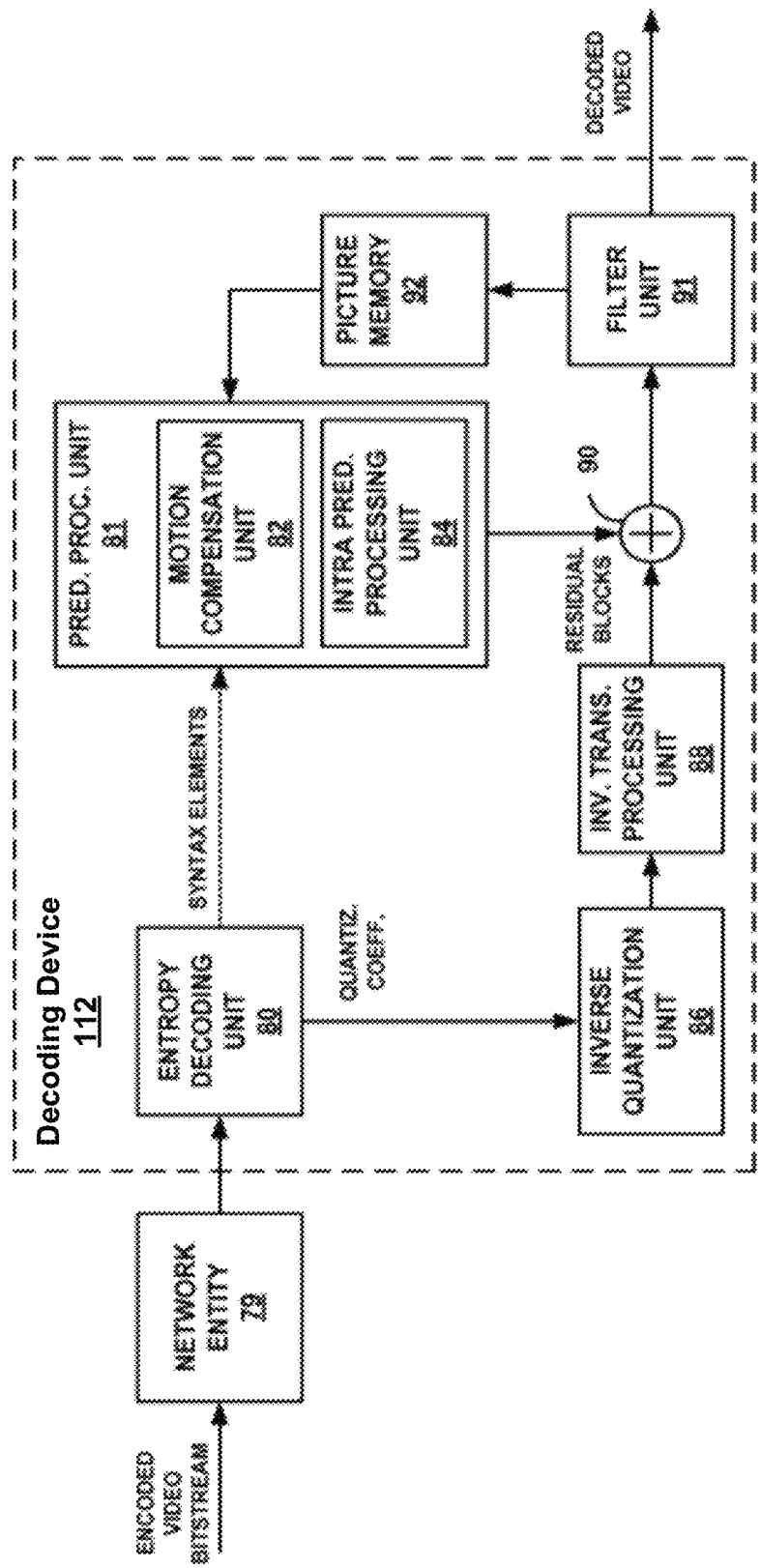
FIG. 13 is a block diagram illustrating an example decoding device.

Specific details of an encoding device 104 and a decoding device 112 are shown in FIG. 12 and FIG. 13, respectively. FIG. 12 is a block diagram illustrating an example encoding device 104 that may implement one or more of the techniques described in this disclosure. Encoding device 104 may, for example, generate the syntax structures described herein (e.g., the syntax structures of a VPS, SPS, PPS, or other syntax elements). Encoding device 104 may perform intra-prediction and inter-prediction coding of video blocks within video slices. As previously described, intra-coding relies, at least in part, on spatial prediction to reduce or remove spatial redundancy within a given video frame or picture. Inter-coding relies, at least in part, on temporal prediction to reduce or remove temporal redundancy within adjacent or surrounding frames of a video sequence. Intra-mode (I mode) may refer to any of several spatial based compression modes. Inter-modes, such as uni-directional prediction (P mode) or bi-prediction (B mode), may refer to any of several temporal-based compression modes.

The encoding device 104 includes a partitioning unit 35, prediction processing unit 41, filter unit 63, picture memory 64, summer 50, transform processing unit 52, quantization unit 54, and entropy encoding unit 56. Prediction processing unit 41 includes motion estimation unit 42, motion compensation unit 44, and intra-prediction processing unit 46. For video block reconstruction, encoding device 104 also includes inverse quantization unit 58, inverse transform processing unit 60, and summer 62. Filter unit 63 is intended to represent one or more loop filters such as a deblocking filter, an adaptive loop filter (ALF), and a sample adaptive offset (SAO) filter. Although filter unit 63 is shown in FIG. 12 as being an in loop filter, in other configurations, filter unit 63 may be implemented as a post loop filter. A post processing device 57 may perform additional processing on encoded video data generated by the encoding device 104. The techniques of this disclosure may in some instances be implemented by the encoding device 104. In other instances, however, one or more of the techniques of this disclosure may be implemented by post processing device 57.

As shown in FIG. 12, the encoding device 104 receives video data, and partitioning unit 35 partitions the data into video blocks. The partitioning may also include partitioning into slices, slice segments, tiles, or other larger units, as wells as video block partitioning, e.g., according to a quadtree structure of LCUs and CUs. The encoding device 104 generally illustrates the components that encode video blocks within a video slice to be encoded. The slice may be divided into multiple video blocks (and possibly into sets of video blocks referred to as tiles). Prediction processing unit 41 may select one of a plurality of possible coding modes, such as one of a plurality of intra-prediction coding modes or one of a plurality of inter-prediction coding modes, for the current video block based on error results (e.g., coding rate and the level of distortion, or the like). Prediction processing unit 41 may provide the resulting intra- or inter-coded block to summer 50 to generate residual block data and to summer 62 to reconstruct the encoded block for use as a reference picture.

Intra-prediction processing unit 46 within prediction processing unit 41 may perform intra-prediction coding of the current video block relative to one or more neighboring blocks in the same frame or slice as the current block to be coded to provide spatial compression. Motion estimation unit 42 and motion compensation unit 44 within prediction processing unit 41 perform inter-predictive coding of the current video block relative to one or more predictive blocks in one or more reference pictures to provide temporal compression.

Motion estimation unit 42 may be configured to determine the inter-prediction mode for a video slice according to a predetermined pattern for a video sequence. The predetermined pattern may designate video slices in the sequence as P slices, B slices, or GPB slices. Motion estimation unit 42 and motion compensation unit 44 may be highly integrated, but are illustrated separately for conceptual purposes. Motion estimation, performed by motion estimation unit 42, is the process of generating motion vectors, which estimate motion for video blocks. A motion vector, for example, may indicate the displacement of a prediction unit (PU) of a video block within a current video frame or picture relative to a predictive block within a reference picture.

A predictive block is a block that is found to closely match the PU of the video block to be coded in terms of pixel difference, which may be determined by sum of absolute difference (SAD), sum of square difference (SSD), or other difference metrics. In some examples, the encoding device 104 may calculate values for sub-integer pixel positions of reference pictures stored in picture memory 64. For example, the encoding device 104 may interpolate values of one-quarter pixel positions, one-eighth pixel positions, or other fractional pixel positions of the reference picture. Therefore, motion estimation unit 42 may perform a motion search relative to the full pixel positions and fractional pixel positions and output a motion vector with fractional pixel precision.

Motion estimation unit 42 calculates a motion vector for a PU of a video block in an inter-coded slice by comparing the position of the PU to the position of a predictive block of a reference picture. The reference picture may be selected from a first reference picture list (List 0) or a second reference picture list (List 1), each of which identify one or more reference pictures stored in picture memory 64. Motion estimation unit 42 sends the calculated motion vector to entropy encoding unit 56 and motion compensation unit 44.

Motion compensation, performed by motion compensation unit 44, may involve fetching or generating the predictive block based on the motion vector determined by motion estimation, possibly performing interpolations to sub-pixel precision. Upon receiving the motion vector for the PU of the current video block, motion compensation unit 44 may locate the predictive block to which the motion vector points in a reference picture list. The encoding device 104 forms a residual video block by subtracting pixel values of the predictive block from the pixel values of the current video block being coded, forming pixel difference values. The pixel difference values form residual data for the block, and may include both luma and chroma difference components. Summer 50 represents the component or components that perform this subtraction operation. Motion compensation unit 44 may also generate syntax elements associated with the video blocks and the video slice for use by the decoding device 112 in decoding the video blocks of the video slice.

Intra-prediction processing unit 46 may intra-predict a current block, as an alternative to the inter-prediction performed by motion estimation unit 42 and motion compensation unit 44, as described above. In particular, intra-prediction processing unit 46 may determine an intra-prediction mode to use to encode a current block. In some examples, intra-prediction processing unit 46 may encode a current block using various intra-prediction modes, e.g., during separate encoding passes, and intra-prediction unit processing 46 (or mode select unit 40, in some examples) may select an appropriate intra-prediction mode to use from the tested modes. For example, intra-prediction processing unit 46 may calculate rate-distortion values using a rate-distortion analysis for the various tested intra-prediction modes, and may select the intra-prediction mode having the best rate-distortion characteristics among the tested modes. Rate-distortion analysis generally determines an amount of distortion (or error) between an encoded block and an original, unencoded block that was encoded to produce the encoded block, as well as a bit rate (that is, a number of bits) used to produce the encoded block. Intra-prediction processing unit 46 may calculate ratios from the distortions and rates for the various encoded blocks to determine which intra-prediction mode exhibits the best rate-distortion value for the block.

In any case, after selecting an intra-prediction mode for a block, intra-prediction processing unit 46 may provide information indicative of the selected intra-prediction mode for the block to entropy encoding unit 56. Entropy encoding unit 56 may encode the information indicating the selected intra-prediction mode. The encoding device 104 may include in the transmitted bitstream configuration data definitions of encoding contexts for various blocks as well as indications of a most probable intra-prediction mode, an intra-prediction mode index table, and a modified intra-prediction mode index table to use for each of the contexts. The bitstream configuration data may include a plurality of intra-prediction mode index tables and a plurality of modified intra-prediction mode index tables (also referred to as codeword mapping tables).

After prediction processing unit 41 generates the predictive block for the current video block via either inter-prediction or intra-prediction, the encoding device 104 forms a residual video block by subtracting the predictive block from the current video block. The residual video data in the residual block may be included in one or more TUs and applied to transform processing unit 52. Transform processing unit 52 transforms the residual video data into residual transform coefficients using a transform, such as a discrete cosine transform (DCT) or a conceptually similar transform. Transform processing unit 52 may convert the residual video data from a pixel domain to a transform domain, such as a frequency domain.

Transform processing unit 52 may send the resulting transform coefficients to quantization unit 54. Quantization unit 54 quantizes the transform coefficients to further reduce bit rate. The quantization process may reduce the bit depth associated with some or all of the coefficients. The degree of quantization may be modified by adjusting a quantization parameter. In some examples, quantization unit 54 may then perform a scan of the matrix including the quantized transform coefficients. Alternatively, entropy encoding unit 56 may perform the scan.

Following quantization, entropy encoding unit 56 entropy encodes the quantized transform coefficients. For example, entropy encoding unit 56 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy encoding technique. Following the entropy encoding by entropy encoding unit 56, the encoded bitstream may be transmitted to the decoding device 112, or archived for later transmission or retrieval by the decoding device 112. Entropy encoding unit 56 may also entropy encode the motion vectors and the other syntax elements for the current video slice being coded.

Inverse quantization unit 58 and inverse transform processing unit 60 apply inverse quantization and inverse transformation, respectively, to reconstruct the residual block in the pixel domain for later use as a reference block of a reference picture. Motion compensation unit 44 may calculate a reference block by adding the residual block to a predictive block of one of the reference pictures within a reference picture list. Motion compensation unit 44 may also apply one or more interpolation filters to the reconstructed residual block to calculate sub-integer pixel values for use in motion estimation. Summer 62 adds the reconstructed residual block to the motion compensated prediction block produced by motion compensation unit 44 to produce a reference block for storage in picture memory 64. The reference block may be used by motion estimation unit 42 and motion compensation unit 44 as a reference block to inter-predict a block in a subsequent video frame or picture.

In this manner, the encoding device 104 of FIG. 12 represents an example of a video encoder configured to generate syntax for a encoded video bitstream. The encoding device 104 may, for example, generate VPS, SPS, and PPS parameter sets as described above. The encoding device 104 may perform any of the techniques described herein, including the processes described above. The techniques of this disclosure have generally been described with respect to the encoding device 104, but as mentioned above, some of the techniques of this disclosure may also be implemented by post processing device 57.

FIG. 13 is a block diagram illustrating an example decoding device 112. The decoding device 112 includes an entropy decoding unit 80, prediction processing unit 81, inverse quantization unit 86, inverse transform processing unit 88, summer 90, filter unit 91, and picture memory 92. Prediction processing unit 81 includes motion compensation unit 82 and intra prediction processing unit 84. The decoding device 112 may, in some examples, perform a decoding pass generally reciprocal to the encoding pass described with respect to the encoding device 104 from FIG. 12.

During the decoding process, the decoding device 112 receives an encoded video bitstream that represents video blocks of an encoded video slice and associated syntax elements sent by the encoding device 104. In some embodiments, the decoding device 112 may receive the encoded video bitstream from the encoding device 104. In some embodiments, the decoding device 112 may receive the encoded video bitstream from a network entity 79, such as a server, a media-aware network element (MANE), a video editor/splicer, or other such device configured to implement one or more of the techniques described above. Network entity 79 may or may not include the encoding device 104. Some of the techniques described in this disclosure may be implemented by network entity 79 prior to network entity 79 transmitting the encoded video bitstream to the decoding device 112. In some video decoding systems, network entity 79 and the decoding device 112 may be parts of separate devices, while in other instances, the functionality described with respect to network entity 79 may be performed by the same device that comprises the decoding device 112.

The entropy decoding unit 80 of the decoding device 112 entropy decodes the bitstream to generate quantized coefficients, motion vectors, and other syntax elements. Entropy decoding unit 80 forwards the motion vectors and other syntax elements to prediction processing unit 81. The decoding device 112 may receive the syntax elements at the video slice level and/or the video block level. Entropy decoding unit 80 may process and parse both fixed-length syntax elements and variable-length syntax elements in or more parameter sets, such as a VPS, SPS, and PPS.

When the video slice is coded as an intra-coded (I) slice, intra prediction processing unit 84 of prediction processing unit 81 may generate prediction data for a video block of the current video slice based on a signaled intra-prediction mode and data from previously decoded blocks of the current frame or picture. When the video frame is coded as an inter-coded (i.e., B, P or GPB) slice, motion compensation unit 82 of prediction processing unit 81 produces predictive blocks for a video block of the current video slice based on the motion vectors and other syntax elements received from entropy decoding unit 80. The predictive blocks may be produced from one of the reference pictures within a reference picture list. The decoding device 112 may construct the reference frame lists, List 0 and List 1, using default construction techniques based on reference pictures stored in picture memory 92.

Motion compensation unit 82 determines prediction information for a video block of the current video slice by parsing the motion vectors and other syntax elements, and uses the prediction information to produce the predictive blocks for the current video block being decoded. For example, motion compensation unit 82 may use one or more syntax elements in a parameter set to determine a prediction mode (e.g., intra- or inter-prediction) used to code the video blocks of the video slice, an inter-prediction slice type (e.g., B slice, P slice, or GPB slice), construction information for one or more reference picture lists for the slice, motion vectors for each inter-encoded video block of the slice, inter-prediction status for each inter-coded video block of the slice, and other information to decode the video blocks in the current video slice.

Motion compensation unit 82 may also perform interpolation based on interpolation filters. Motion compensation unit 82 may use interpolation filters as used by the encoding device 104 during encoding of the video blocks to calculate interpolated values for sub-integer pixels of reference blocks. In this case, motion compensation unit 82 may determine the interpolation filters used by the encoding device 104 from the received syntax elements, and may use the interpolation filters to produce predictive blocks.

Inverse quantization unit 86 inverse quantizes, or de-quantizes, the quantized transform coefficients provided in the bitstream and decoded by entropy decoding unit 80. The inverse quantization process may include use of a quantization parameter calculated by the encoding device 104 for each video block in the video slice to determine a degree of quantization and, likewise, a degree of inverse quantization that should be applied. Inverse transform processing unit 88 applies an inverse transform (e.g., an inverse DCT or other suitable inverse transform), an inverse integer transform, or a conceptually similar inverse transform process, to the transform coefficients in order to produce residual blocks in the pixel domain.

After motion compensation unit 82 generates the predictive block for the current video block based on the motion vectors and other syntax elements, the decoding device 112 forms a decoded video block by summing the residual blocks from inverse transform processing unit 88 with the corresponding predictive blocks generated by motion compensation unit 82. Summer 90 represents the component or components that perform this summation operation. If desired, loop filters (either in the coding loop or after the coding loop) may also be used to smooth pixel transitions, or to otherwise improve the video quality. Filter unit 91 is intended to represent one or more loop filters such as a deblocking filter, an adaptive loop filter (ALF), and a sample adaptive offset (SAO) filter. Although filter unit 91 is shown in FIG. 13 as being an in loop filter, in other configurations, filter unit 91 may be implemented as a post loop filter. The decoded video blocks in a given frame or picture are then stored in picture memory 92, which stores reference pictures used for subsequent motion compensation. Picture memory 92 also stores decoded video for later presentation on a display device.

In the foregoing description, aspects of the application are described with reference to specific embodiments thereof, but those skilled in the art will recognize that the invention is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described invention may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The various illustrative logical blocks, modules, circuits, and algorithm steps described in connection with the embodiments disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for encoding and decoding, or incorporated in a combined video encoder-decoder (CODEC).

What is claimed is:

1. A method for processing video data, comprising:
   obtaining 360-degree video data including a plurality of video frames, each video frame of the plurality of video frames including a spherical representation of video data;
   segmenting a video frame from the plurality of video frames into a top region, a middle region, and a bottom region, the top region including a first circular area of the spherical representation, the bottom region including a second circular area of the spherical representation that is opposite on the spherical representation from the first circular area, wherein the middle region includes an area of the spherical representation not included in the top region or the bottom region;
   mapping the top region into a first rectangular area of an output video frame, wherein mapping the top region includes expanding video data included in the first circular area to fill the first rectangular area and using a parameter that varies an amount by which pixel sampling density changes from one or more edges of the first rectangular area towards a middle of the first rectangular area, each pixel of the first rectangular area including at least a portion of the video data included in the first circular area of the spherical representation; and
   mapping the bottom region into a second rectangular area of the output video frame, wherein mapping the bottom region includes expanding video data included in the second circular area to fill the second rectangular area and using the parameter, each pixel of the second rectangular area including at least a portion of the video data included in the second circular area of the spherical representation.

2. The method of claim 1, wherein the video frame is segmented at a first latitude above an equator of the spherical representation and a second latitude below the equator, wherein the first latitude and the second latitude are equidistant from the equator, wherein the top region is above the first latitude, and wherein the bottom region is below the second latitude.

3. The method of claim 1, wherein mapping the top region and mapping the bottom region includes:
   selecting a pixel location in the output video frame;
   determining a point on the spherical representation corresponding to the pixel location, wherein the point on the spherical representation is determined using a mapping for converting from a square to a circle;
   sampling a pixel from the point on the spherical representation; and
   placing the sampled pixel at the pixel location.

4. The method of claim 3, wherein mapping the top region and mapping the bottom region using the parameter includes:
   adjusting the pixel location using a gradual curve function.

5. The method of claim 4, wherein the gradual curve function is used at pixel locations in an area adjacent to an additional rectangular area in the output video frame.

6. The method of claim 4, wherein the gradual curve function changes pixel locations less towards a middle area of the first rectangular area or the second rectangular area as compared to one or more areas outside of the middle area, and wherein the gradual curve function changes pixel locations more towards an outside area of the first rectangular area or the second rectangular area as compared to one or more areas outside of the outside area.

7. The method of claim 1, further comprising:
mapping the middle region to one or more rectangular areas of the output video frame.

8. The method of claim 7, wherein the middle region includes a left view, a front view, and a right view, wherein the left view is placed in the output video frame adjacent to the front view, and wherein the right view is placed adjacent to the front view.

9. The method of claim 1, wherein the middle region includes a back view, wherein the bottom region is placed in the output video frame adjacent to the back view, and wherein the top region is placed adjacent to the back view.

10. The method of claim 1, wherein mapping the top region into the first rectangular area using the parameter includes applying a gradual adjustment defined by the parameter in an area where the first rectangular area is adjacent to a third rectangular area in the output video frame, and wherein mapping the bottom region into the second rectangular area using the parameter includes applying the gradual adjustment defined by the parameter in an area where the second rectangular area that is adjacent to a fourth rectangular area in the output video frame.

11. The method of claim 1, wherein the output video frame has a three-by-two aspect ratio.

12. A video coding device comprising:
a memory configured to store 360-degree video data including a plurality of video frames, each video frame of the plurality of video frames including a spherical representation of video data; and
a processor configured to:
segment a video frame from the plurality of video frames into a top region, a middle region, and a bottom region, the top region including a first circular area of the spherical representation, the bottom region including a second circular area of the spherical representation that is opposite on the spherical representation from the first circular area, wherein the middle region includes an area of the spherical representation not included in the top region or the bottom region;
map the top region into a first rectangular area of an output video frame, wherein mapping the top region includes expanding video data included in the first circular area to fill the first rectangular area and using a parameter that varies an amount by which pixel sampling density changes from one or more edges of the first rectangular area towards a middle of the first rectangular area, each pixel of the first rectangular area including at least a portion of the video data included in the first circular area of the spherical representation; and
map the bottom region into a second rectangular area of the output video frame, wherein mapping the bottom region includes expanding video data included the second circular area to fill the second rectangular area and using the parameter, each pixel of the second rectangular area including at least a portion of the video data included in the second circular area of the spherical representation.

13. A non-transitory computer-readable medium having stored thereon instructions that, when executed by one or more processors, cause the one or more processors to perform operations including:
obtaining 360-degree video data including a plurality of video frames, each video frame of the plurality of video frames including a spherical representation of video data;
segmenting a video frame from the plurality of video frames into a top region, a middle region, and a bottom region, the top region including a first circular area of the spherical representation, the bottom region including a second circular area of the spherical representation that is opposite on the spherical representation from the first circular area, wherein the middle region includes an area of the spherical representation not included in the top region or the bottom region;
mapping the top region into a first rectangular area of an output video frame, wherein mapping the top region includes expanding video data included in the first circular area to fill the first rectangular area and using a parameter that varies an amount by which pixel sampling density changes from one or more edges of the first rectangular area towards a middle of the first rectangular area, each pixel of the first rectangular area including at least a portion of the video data included in the first circular area of the spherical representation; and
mapping the bottom region into a second rectangular area of the output video frame, wherein mapping the bottom region includes expanding video data included the second circular area to fill the second rectangular area and using the parameter, each pixel of the second rectangular area including at least a portion of the video data included in the second circular area of the spherical representation.

14. An apparatus, comprising:
means for obtaining 360-degree video data including a plurality of video frames, each video frame of the plurality of video frames including a spherical representation of video data;
means for segmenting a video frame from the plurality of video frames into a top region, a middle region, and a bottom region, the top region including a first circular area of the spherical representation, the bottom region including a second circular area of the spherical representation that is opposite on the spherical representation from the first circular area, wherein the middle region includes an area of the spherical representation not included in the top region or the bottom region;
means for mapping the top region into a first rectangular area of an output video frame, wherein mapping the top region includes expanding video data included in the first circular area to fill the first rectangular area and using a parameter that varies an amount by which pixel sampling density changes from one or more edges of the first rectangular area towards a middle of the first rectangular area, each pixel of the first rectangular area including at least a portion of the video data included in the first circular area of the spherical representation; and
mapping the bottom region into a second rectangular area of the output video frame, wherein mapping the bottom region includes expanding video data included the second circular area to fill the second rectangular area and using the parameter, each pixel of the second rectangular area including at least a portion of the video data included in the second circular area of the spherical representation.

15. The video coding device of claim 12, wherein the video frame is segmented at a first latitude above an equator of the spherical representation and a second latitude below the equator, wherein the first latitude and the second latitude are equidistant from the equator, wherein the top region is above the first latitude, and wherein the bottom region is below the second latitude.

16. The video coding device of claim 12, wherein the processor is configured to:
select a pixel location in the output video frame;
determine a point on the spherical representation corresponding to the pixel location, wherein the point on the spherical representation is determined using a mapping for converting from a square to a circle;
sample a pixel from the point on the spherical representation; and
place the sampled pixel at the pixel location.

17. The video coding device of claim 16, wherein the processor is configured to:
adjust adjusting the pixel location using a gradual curve function.

18. The video coding device of claim 17, wherein the gradual curve function is used at pixel locations in an area adjacent to an additional rectangular area in the output video frame.

19. The video coding device of claim 17, wherein the gradual curve function changes pixel locations less towards a middle area of the first rectangular area or the second rectangular area as compared to one or more areas outside of the middle area, and wherein the gradual curve function changes pixel locations more towards an outside area of the first rectangular area or the second rectangular area as compared to one or more areas outside of the outside area.

20. The video coding device of claim 12, wherein the processor is configured to:
map the middle region to one or more rectangular areas of the output video frame.

21. The video coding device of claim 20, wherein the middle region includes a left view, a front view, and a right view, wherein the left view is placed in the output video frame adjacent to the front view, and wherein the right view is placed adjacent to the front view.

22. The video coding device of claim 12, wherein the middle region includes a back view, wherein the bottom region is placed in the output video frame adjacent to the back view, and wherein the top region is placed adjacent to the back view.

23. The video coding device of claim 12, wherein the processor is configured to:
apply a gradual adjustment defined by the parameter in an area where the first rectangular area is adjacent to a third rectangular area in the output video frame; and
apply the gradual adjustment defined by the parameter in an area where the second rectangular area that is adjacent to a fourth rectangular area in the output video frame.

24. The video coding device of claim 12, wherein the output video frame has a three-by-two aspect ratio.

25. The non-transitory computer-readable medium of claim 13, wherein the video frame is segmented at a first latitude above an equator of the spherical representation and a second latitude below the equator, wherein the first latitude and the second latitude are equidistant from the equator, wherein the top region is above the first latitude, and wherein the bottom region is below the second latitude.

26. The non-transitory computer-readable medium of claim 13, further comprising instructions that, when executed by the one or more processors, cause the one or more processors to perform operations including:
selecting a pixel location in the output video frame;
determining a point on the spherical representation corresponding to the pixel location, wherein the point on the spherical representation is determined using a mapping for converting from a square to a circle;
sampling a pixel from the point on the spherical representation; and
placing the sampled pixel at the pixel location.

27. The non-transitory computer-readable medium of claim 26, further comprising instructions that, when executed by the one or more processors, cause the one or more processors to perform operations including:
adjusting the pixel location using a gradual curve function.

28. The non-transitory computer-readable medium of claim 27, wherein the gradual curve function is used at pixel locations in an area adjacent to an additional rectangular area in the output video frame.

29. The non-transitory computer-readable medium of claim 27, wherein the gradual curve function changes pixel locations less towards a middle area of the first rectangular area or the second rectangular area as compared to one or more areas outside of the middle area, and wherein the gradual curve function changes pixel locations more towards an outside area of the first rectangular area or the second rectangular area as compared to one or more areas outside of the outside area.

* * * * *